(12) United States Patent
Atsumi

(10) Patent No.: US 6,987,582 B1
(45) Date of Patent: Jan. 17, 2006

(54) IMAGING FORMING APPARATUS CAPABLE OF REPEATEDLY READING OUT AND PRINTING STORED IMAGE DATA

(75) Inventor: Tomoyuki Atsumi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/422,149

(22) Filed: Oct. 20, 1999

(30) Foreign Application Priority Data

Oct. 21, 1998 (JP) .......................................... 10-299888

(51) Int. Cl.
H04N 1/00 (2006.01)

(52) U.S. Cl. .......................... 358/1.6; 358/403; 358/444; 358/498; 358/496; 358/401; 358/497; 399/367; 399/371; 399/380

(58) Field of Classification Search ................. 358/444, 358/403, 498, 496, 401, 497; 399/367, 371, 399/380

See application file for complete search history.

(56) References Cited

U.S. PATENT DOCUMENTS

| | | | | |
|---|---|---|---|---|
| 4,797,706 A | * | 1/1989 | Sugishima et al. ......... | 358/300 |
| 5,513,017 A | * | 4/1996 | Knodt et al. ................. | 358/471 |
| 5,587,801 A | * | 12/1996 | Kamei et al. ................ | 358/296 |
| 5,682,227 A | * | 10/1997 | Taguchi et al. ................ | 355/25 |
| 5,740,496 A | * | 4/1998 | Kawabuchi et al. .......... | 399/83 |
| 5,832,331 A | * | 11/1998 | Yoshida et al. ................ | 399/43 |
| 5,854,964 A | * | 12/1998 | Atsumi ........................ | 399/371 |
| 5,930,006 A | * | 7/1999 | Yoshida et al. ............. | 358/450 |
| 5,933,686 A | * | 8/1999 | Ootsuka et al. ................ | 399/87 |
| 6,331,900 B1 | * | 12/2001 | Kuno .......................... | 358/1.9 |
| 6,643,028 B1 | * | 11/2003 | Ogaki et al. ................. | 358/1.6 |

FOREIGN PATENT DOCUMENTS

JP 6-54143 2/1994

* cited by examiner

Primary Examiner—Kimberly Williams
Assistant Examiner—Ashanti Ghee
(74) Attorney, Agent, or Firm—McDermott Will & Emery LLP

(57) ABSTRACT

An image forming apparatus which is superior in operability and does not uselessly read image data is provided. When image data is once read and then a copy start key is pressed again, a determination is made as to whether an automatic document feeder has not been opened and a new original has not been set in the automatic document feeder from the end of a previous read operation to the next pressing of the start key. If the condition is satisfied, image data which is stored in a memory by the previous read operation is read out and printed. If the condition is not satisfied, an original image is read again.

7 Claims, 42 Drawing Sheets

FIG. 6

CODE MANAGEMENT TABLE MT

| REGION | IMAGE ID | FORWARD LINKAGE | BACKWARD LINKAGE |
|---|---|---|---|
| 01 | 1 | FF | 02 |
| 02 | 1 | 01 | FF |
| 03 | 2 | FF | 04 |
| 04 | 2 | 03 | FF |
|  |  |  |  |
|  |  |  |  |

FIG. 7

CODE MEMORY

| REGION 01 | CODE INFORMATION 1 OF IMAGE ID1 |
|---|---|
| 02 | CODE INFORMATION 2 OF IMAGE ID1 |
| 03 | CODE INFORMATION 1 OF IMAGE ID2 |
| 04 | CODE INFORMATION 2 OF IMAGE ID2 |
|  |  |

FIG. 8

1ST NUMBER (=JOB NUMBER) = 1

| IMAGE ID | SIZE | FORWARD LINKAGE | BACKWARD LINKAGE |
|---|---|---|---|
| 0 | A4Y | FF | 1 |
| 1 | A4Y | 0 | 2 |
| 2 | A4Y | 1 | 3 |
| 3 | A4Y | 2 | 4 |
| . | . | . | . |
| . | . | . | . |
| 10 | A4Y | 9 | FF |

COPY MODE : M1 ,
ORIGINAL READING TIME : T1

FIG. 9

PANEL TABLE PT

| ADDRESS | COPY MODE (MAGNIFICATION, PRINT NUMBER, AND SO ON) | REGISTERED TIME |
|---|---|---|
| M1 | ... | ... |
| M2 | ... | ... |
| M3 | ... | ... |
| ⋮ | ⋮ | ⋮ |

READ-OUT/PRINT OPERATION

IMAGING FORMING APPARATUS CAPABLE OF REPEATEDLY READING OUT AND PRINTING STORED IMAGE DATA

This application is based on application No. 10-299888 filed in Japan, the contents of which is hereby incorporated by reference.

BACKGROUND OF THE INVENTION

1. Field of the Invention

The present invention relates to image forming apparatuses, and more particularly, to an image forming apparatus capable of reading image data from an original, storing the read image data, and repeatedly reading out and printing the stored image data.

2. Description of the Related Art

There have been known image forming apparatuses (such as copying machines, printers, facsimiles and combined machines thereof) capable of reading image data from an original and storing the read image data once.

In such image formation apparatuses, an operation of reading image data and an operation of printing the read image data can be performed independently. Further, image data which was once printed and then stored can be read out and printed. It is therefore unnecessary to repeatedly read the same image data. The operation of reading out and printing stored image data again in this manner is called memory recall.

In an image forming apparatus having such a memory recall function, for example, a user may wish to read and print an original and, immediately thereafter, additionally print the same original. If the original is to be printed by the memory recall function at this time, key operation for this purpose is necessary, which is troublesome for the user.

If a user presses down a print key (start key) for easier operation in such a circumstance, the image data of an original is read again and it takes longer time to print the data.

SUMMARY OF THE INVENTION

The present invention was made to solve the above described problems and its object is to provide an image forming apparatus which is superior in operability and does not uselessly read image data.

In order to accomplish the above described object, according to one aspect of the present invention, an image forming apparatus printing image data includes a platen holding an original, an original cover, capable of opening and closing, covering the platen, a read unit reading image data from the original, a print unit printing the image data, a sensor sensing opening and closing of the original cover, and a controller storing the read image data, and determining whether to read and print image data from the original on the platen or to read out and print the stored image data without reading image data from the original, based on the sensing result of the sensor after printing by the print unit till issuance of a new print request.

According to another aspect of the present invention, an image forming apparatus printing image data includes an automatic document feeder setting a plurality of originals, a read unit reading image data from the original, a print unit printing the image data, a first sensor sensing setting of a new original in the automatic document feeder, and a controller storing the read image data, and determining whether to read and print image data from the original set in the automatic document feeder or to read out and print the stored image data without reading image data from the original, based on the sensing result of the first sensor after printing by the print unit till issuance of a new print request.

According to yet another aspect of the present invention, a method of controlling an image forming apparatus printing read image data includes the steps of storing the read image data, sensing opening and closing of an original cover covering a platen for holding an original, and determining whether to read and print image data from the original on the platen or to read out and print the stored image data without reading image data from the original, based on the sensing result of opening and closing of the cover after printing of the image data till issuance of a new print request.

According to yet another aspect of the present invention, a method of controlling an image forming apparatus printing read image data includes the steps of storing the read image data, sensing setting of a new original in an automatic document feeder capable of setting a plurality of originals, sensing opening and closing of the automatic document feeder, and determining whether to read and print image data from the original on a platen or to read out and print the stored image data without reading image data from the original, based on the sensing result of the two detection steps after printing of the image data till issuance of a new print request.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows a specific example of a code management table MT.

FIG. 7 shows a specific example of a code memory.

FIG. 8 shows a specific example of a job management table.

FIG. 9 shows the contents of a panel table PT.

DESCRIPTION OF THE PREFERRED EMBODIMENTS

First Embodiment

Figure 1:
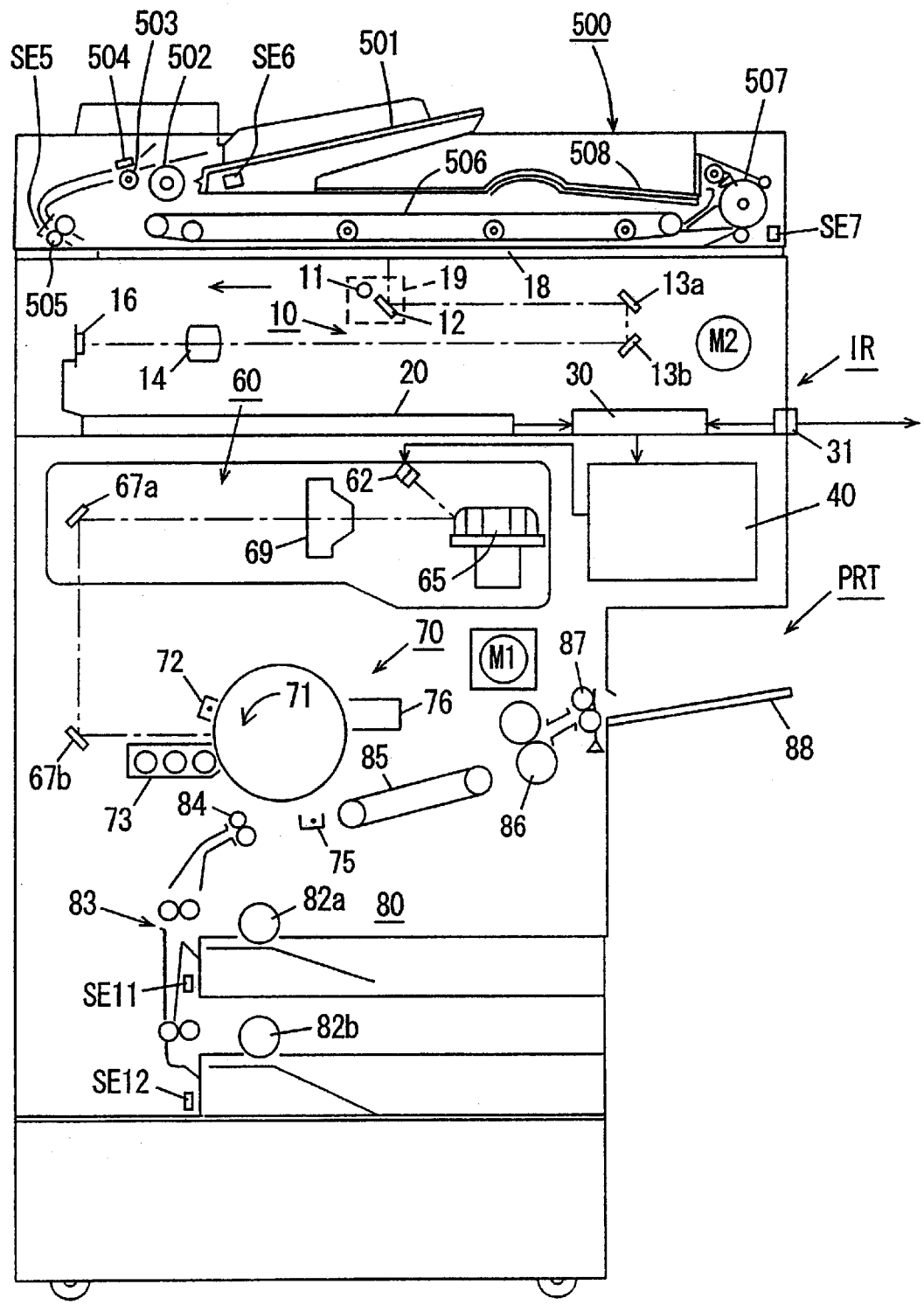
FIG. 1 is a block diagram showing a structure of a digital copying machine in a first embodiment of the present invention.

Referring to FIG. 1, a digital copying machine transports originals on a platen glass 18 one by one by an automatic document feeder (referred to as an ADF, hereinafter). The digital copying machine reads images of the originals on platen glass 18, drives a laser beam scanning optical system 60 based on the read image data, and forms electrostatic latent images on a photoreceptor drum 71. The digital copying machine develops the electrostatic latent images.

The digital copying machine includes a read system 10 reading an original image and converting it into image data, an image data processing unit 20 processing the image data transmitted from read system 10, a memory unit 30, a print processing unit 40 driving optical system 60 based on print data transmitted from memory unit 30, an optical system 60 directing a laser beam emitted from a semiconductor laser 62 on photoreceptor drum 71, an image forming system 70 developing and transferring an electrostatic latent image formed on photoreceptor drum 71, a sheet transport system 80, and an ADF 500, which can open and close, including a function of transporting an original and reversing it up side down when it is a both-side original. A sensor SE 7 senses opening and closing of ADF 500. A sensor SE 6 senses setting of an original in ADF 500.

Read system 10, image data processing unit 20, and memory unit 30 form an image reader IR. Print processing unit 40, optical system 60, image forming system 70, and sheet transport system 80 form a printer PRT.

Read system 10 is formed of an exposure lamp 11 and a mirror 12 attached to a scanner 19 which moves below platen glass 18, second and third mirrors 13a, 13b, a collective lens 14, a photoelectric conversion element 16 using a CCD array or the like, a scan motor M2, and so on.

Image data is input to memory unit 30 through image data processing unit 20 or an external interface 31.

Print processing unit 40 drives optical system 60 line by line in the main scanning direction based on print data.

Optical system 60 is formed of a semiconductor laser 62 controlled by print processing unit 40 so as to be modulated (turned on/off), a polygon mirror 65 polarizing and scanning a laser beam emitted from semiconductor laser 62, a f$\theta$ lens 69 correcting, for example, distortion of the polarized laser beam, and mirrors 67a, 67b directing the laser beam to the photoreceptor drum.

Image forming system 70 has a corona charger 72, a developing unit 73, a transfer charger 75, and a remaining toner cleaner 76 arranged around and in the rotational direction of photoreceptor drum 71 which rotates in the direction of arrow. Since the image forming process of image forming system 70 is well known, it will not be described.

Sheet transport system 80 is formed of an automatic feeding cassette which houses laminated sheets, rollers 82a, 82b feeding sheets one by one, a sheet transport path 83, a timing roller 84, a transport belt 85, a toner fixing unit 86, a discharge roller 87, and a discharge tray 88. Sheet transport system 80 and photoreceptor drum 71 are driven by a main motor M1. Further, sheet detection sensors are provided at important positions on the sheet transport path.

ADF 500 is formed of an original tray 501, a pickup roller 502, a sorting roller 503, a sorting pad 504, a register roller 505, a transport belt 506, a reverse roller 507, and a discharge tray 508. Originals placed on tray 501 are transported onto platen glass 18 one by one from the bottom one. A transported original is stopped on platen glass 18 and its image data is read by read system 10. After reading, the original turns around reverse roller 507 and returns onto platen glass 18. Therefore, transport belt 506 is made reversible. The original size is sensed by sensor SE 5 immediately before the original is fed onto platen glass 18.

In the normal mode, the copying machine thus formed reads an image of one original, produces print data by making necessary corrections on the image data, outputs the print data using optical system 60, and forms an image on one sheet.

Figure 2:
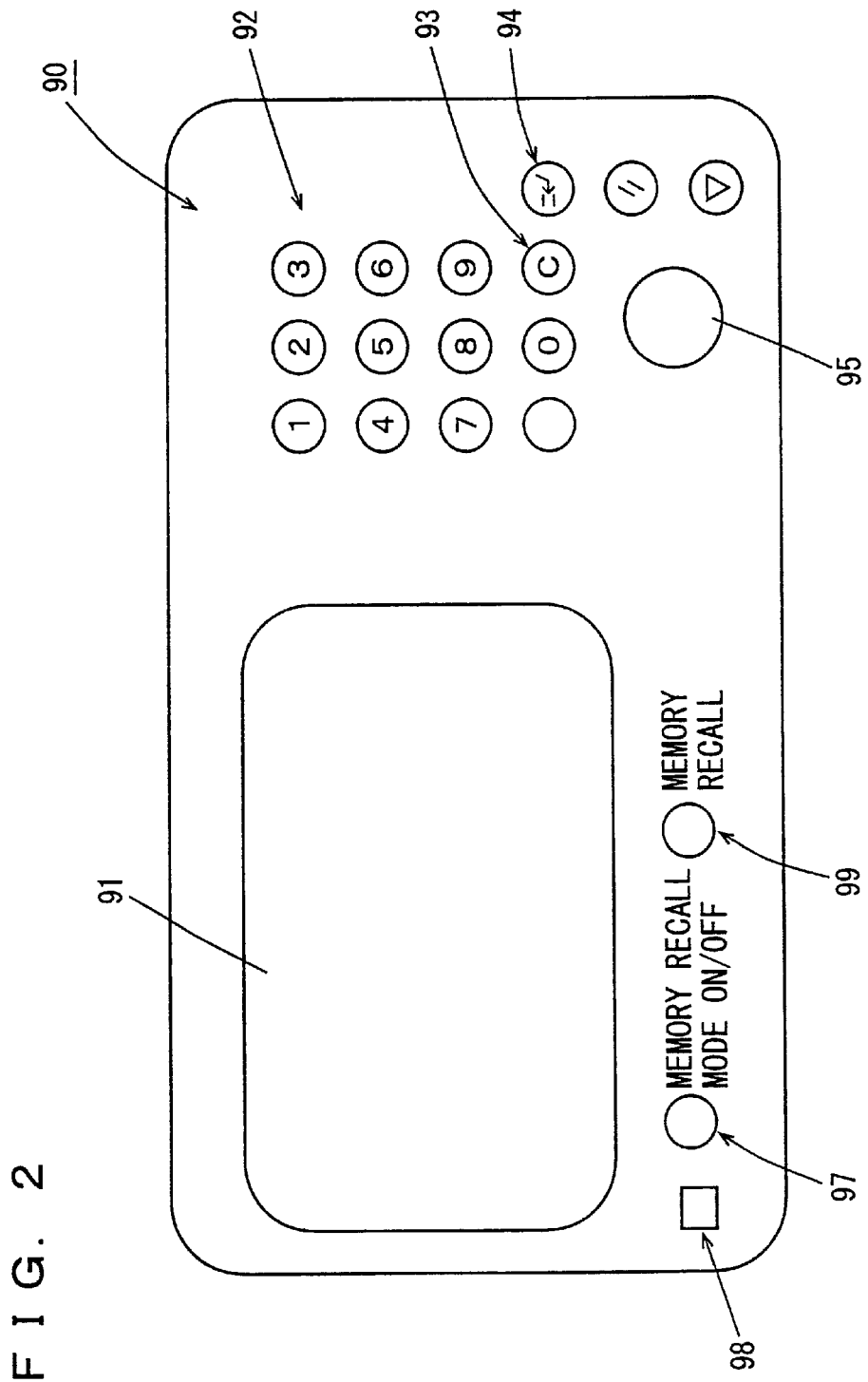
FIG. 2 is a plan view of an operation panel of the digital copying machine.

FIG. 2 is a plan view of an operation panel 90 provided in the digital copying machine in FIG. 1. Referring to FIG. 2, operation panel 90 includes a liquid crystal touch panel 91, a ten key 92, a clear key 93 for returning a set numerical value to an initial value, an interrupt key 94 for executing interrupt copying, a copy start key 95, a memory recall mode on/off key 97 for setting on/off of a memory recall mode, a memory recall mode on displaying LED 98 for indicating that the memory recall mode is on, and a memory recall key 99 for executing memory recall.

The memory recall mode is a mode in which image data read by image reader IR can be stored in a code memory even after it is printed, and the image data can be read out and printed again when necessary. When the memory recall mode is on, image data read by image reader IR is automatically stored in the code memory. When memory recall key 99 is pressed down by a user, a list of image data stored in the code memory is displayed, and the user can choose image data which he/she wishes to print (image data which the user wishes to recall) from the list.

When the memory recall mode is off, however, image data read by image reader IR is printed by printer PRT and thereafter automatically deleted from the code memory.

It is noted that the copy mode of the digital copying machine is set in the normal mode in the initial state when the digital copying machine is powered on. In the normal mode, the memory recall mode is on. Therefore, memory recall mode on displaying LED 98 is lit in the initial state. When a user presses down memory recall mode on/off key 97, memory recall mode on displaying LED 98 is turned off and thus the memory recall mode is off.

Figure 3:
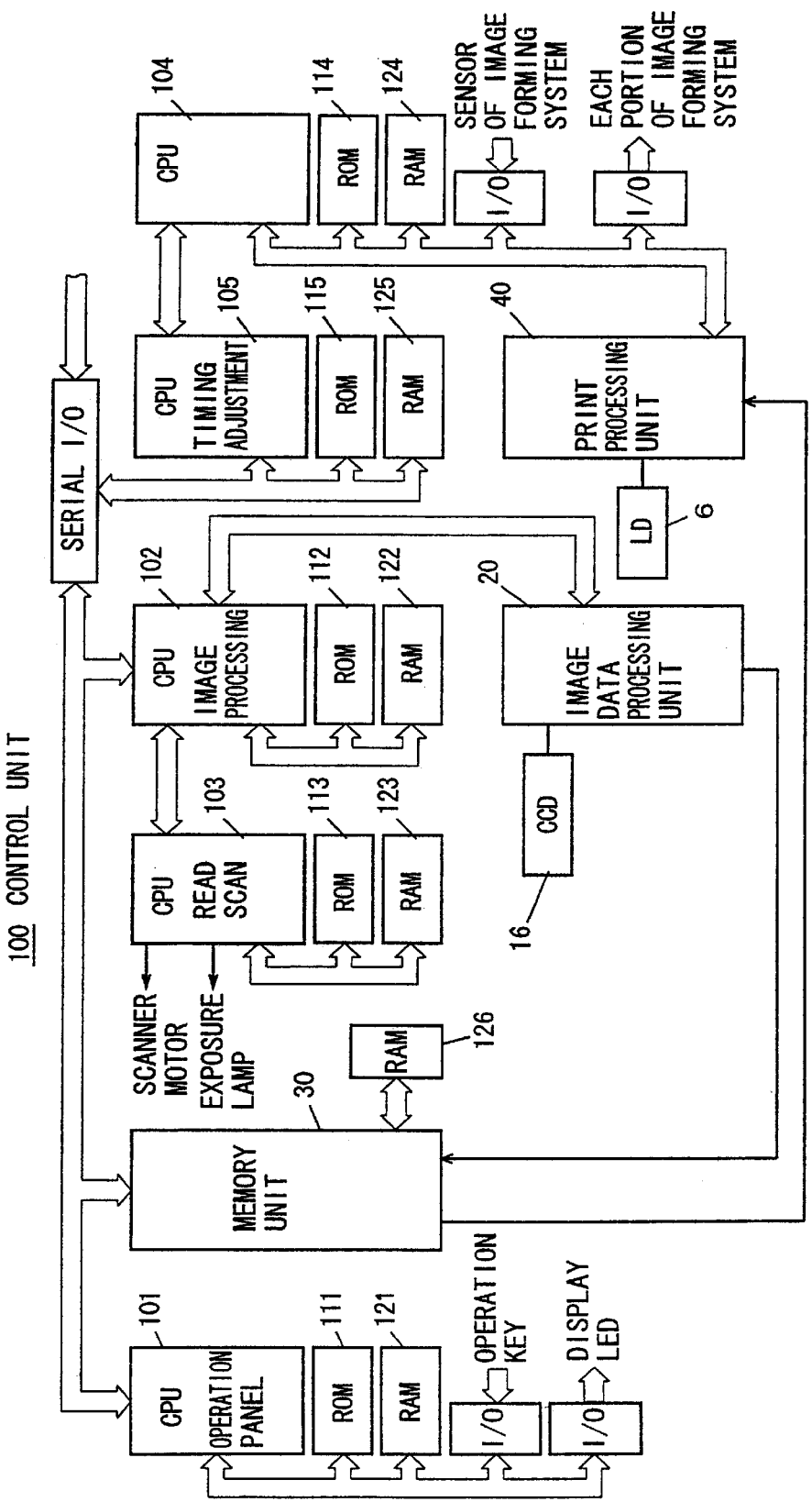
FIGS. 3 and 4 are block diagrams showing structures of a control unit of the digital copying machine.
Figure 4:
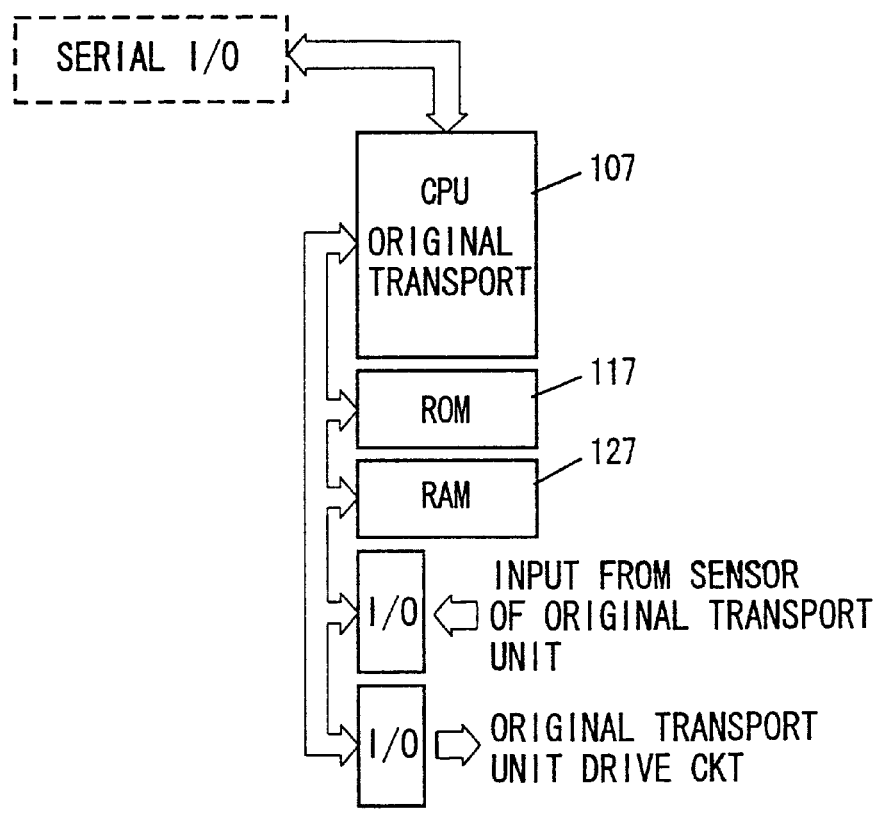

FIGS. 3 and 4 are block diagrams showing an overall structure of a control unit provided in the digital copying machine in FIG. 1. Referring to FIGS. 3 and 4, the control unit is mainly formed of six CPUs 101 to 105, 107, which respectively have ROMs 111 to 115, 117 storing a necessary program, and RAMs 121 to 125, 127 serving as a work area for program execution.

CPU 101 controls inputting of signals from various operation keys of operation panel 90 and displaying on liquid crystal touch panel 91. CPU 102 controls each portion of image data processing unit 20. CPU 103 controls driving of read system 10.

CPU 104 controls print processing unit 40, optical system 60, image forming system 70, and sheet transport system 80. Detection signals from sheet detection sensors provided at each portion are input to CPU 104 through I/Os.

Figure 5:
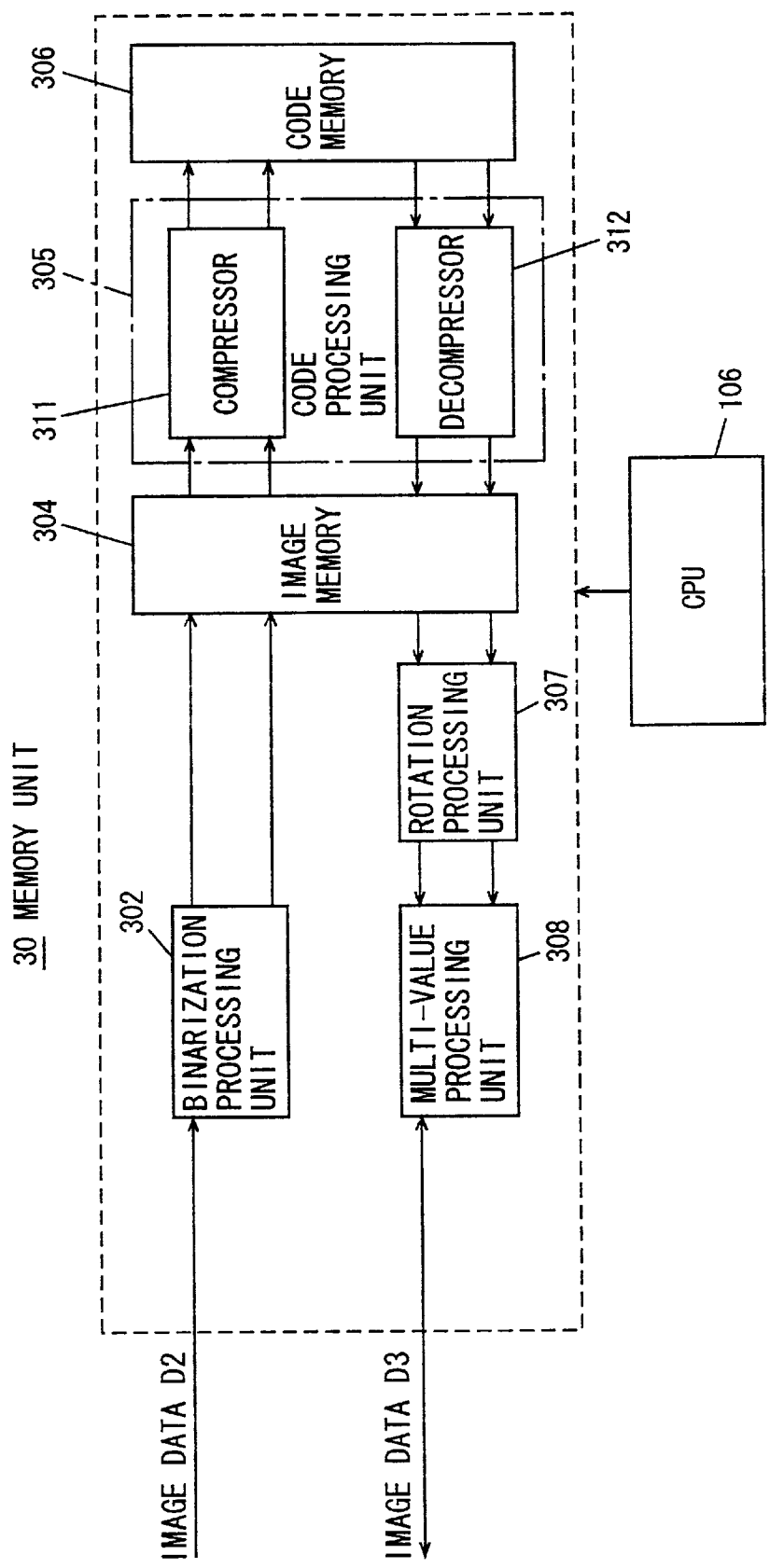
FIG. 5 is a block diagram showing a structure of memory unit 30.

CPU 105 controls the time adjustment and operation mode setting for the entire control unit. CPU 106 controls memory unit 30, as shown in FIG. 5, and it processes, as necessary, image data transferred from image data processing unit 20 and produces print data by controlling memory unit 30. The produced print data is transferred to print processing unit 40.

CPU 107 controls ADF 500 and is connected to CPUs 101, 102, 105 by a serial I/O. Instructions such as feeding, transporting and discharging of an original are made by CPU 105.

Each processing unit for processing image data will be described in the following. Image data processing unit 20 is formed, for example, of an A/D converter, a shading correcting portion, and a well known image correcting portion carrying out image quality correction such as MTP correction and y correction, magnification change, image edit and the like.

FIG. 5 is a block diagram showing a specific structure of memory unit 30. Referring to FIG. 5, memory unit 30 is controlled by CPU 106. Memory unit 30 is formed of a binalization processing unit 302 producing binary data, an image memory 304, an RAM 126 (FIG. 3) producing a code management table MT, a code processing unit 305 having a compressor 311 and a decompressor 312 capable of operating independently from each other, a code memory 306 having multiple ports, a rotation processing unit 307, and a multi-value processing unit 308.

One page of image data D2 transferred from image data processing unit 20 is first written to image memory 304. The image data is compressed by compressor 311 and written to code memory 306. The image data written to code memory 306 is read out as instructed by CPU 106, decompressed by decompressor 312, and then written to image memory 304.

The image data written to image memory 304 is transferred as print data to print processing unit 40, and printed on photoreceptor drum 71 by driving of optical system 60. Rotation processing unit 307 included in memory unit 30 rotates the print data as necessary.

Code memory 306 is managed by code management table MT stored in RAM 126.

FIG. 6 shows a specific example of code management table MT, and FIG. 7 shows a specific example of code memory 306. Referring to FIGS. 6 and 7, the code memory is divided into memory regions of 32 k bytes. Each region stores code data for each original image to allow for simultaneous control of writing (in reading an original) and reading (in printing).

Code management table MT stores various information necessary for compression and decompression. Code memory 360 is dynamically managed based on the stored information. In FIG. 7, one original image is dividedly stored in two regions. That is, the original image of an image ID1 is stored in regions 01, 02 of the code memory. Storing the original image of image ID1 in regions 01, 02 is managed by region numbers and image ID numbers stored in management table MT.

In code management table MT, "forward linkage" is a column indicating image data stored in a certain region is a continuation from which region. Specifically, when the numerical value of the forward linkage is "01," image data in that region is a continuation from region "01." When the forward linkage is "FF," that region stores the top of an image.

Similarly, "backward linkage" indicates the number of a region following that region. Specifically, when the backward linkage is "02," it indicates that a continuation of image data in that region is stored in region "02." When the backward linkage is "FF," it indicates that the region stores the last data of image data.

In this manner, even when one piece of image data is divided into a large number of regions for storage, the divided image data can be linked easily by using forward linkage and backward linkage information.

When CPU 106 reads out and compresses image data from image memory 304, it controls compressor 311 while it produces information in code management table MT. Thus, the image data is written to code memory 306. When CPU 106 reads out image data from code memory 306, it performs opposite control from that for writing.

When the memory recall mode is off, image data is read out from code memory 306, and information corresponding to the image data in code management table MT is deleted after a set number of copies are completed. When the memory recall mode is on, however, the information in code management table MT is maintained even after copying.

FIG. 8 shows a specific example of a job management table (IST table) stored in RAM 125. The IST table stores, by associating, a copy mode which is set for one job, an image ID number corresponding to the job, and time for reading an original in the job.

It is noted that one job means one copy operation accepted by the digital copying machine. A job number (IST number) is given for each job. In this embodiment, an address of panel table PT is stored as a copy mode in the job management table. Panel table PT is a table which stores a copy mode (such as the rate of magnification and the number of prints) and registered time of the job corresponding to an address as shown in FIG. 9.

FIG. 8 shows a job management table in which the IST number=1. The job management table is formed so that original information corresponding to the job can be obtained from the top image ID registered in the job management table. In FIG. 8, the original of image ID=0 has a size of A4Y and the following original is the one of image ID=1 as indicated by the column of "backward linkage."

Since "forward linkage" for the original of image ID=0 is "FF," the original of image ID=0 turns out to be the top original in the job. By referring to the job management table while checking the column of "backward linkage" in order, ten originals from the one of image ID=0 to the one of image ID=10 can be obtained. Since the original of image ID=10 has its "backward linkage" of "FF," it turns out to be the last original.

Image information can be obtained from an image ID, which is thus obtained, corresponding to a specific IST, and the code management table.

It is noted that the original reading time stored for each job is time required for reading image data of an original in one job and it is actually measured by a timer. A method of measuring the original reading time will be described below.

Figure 10:
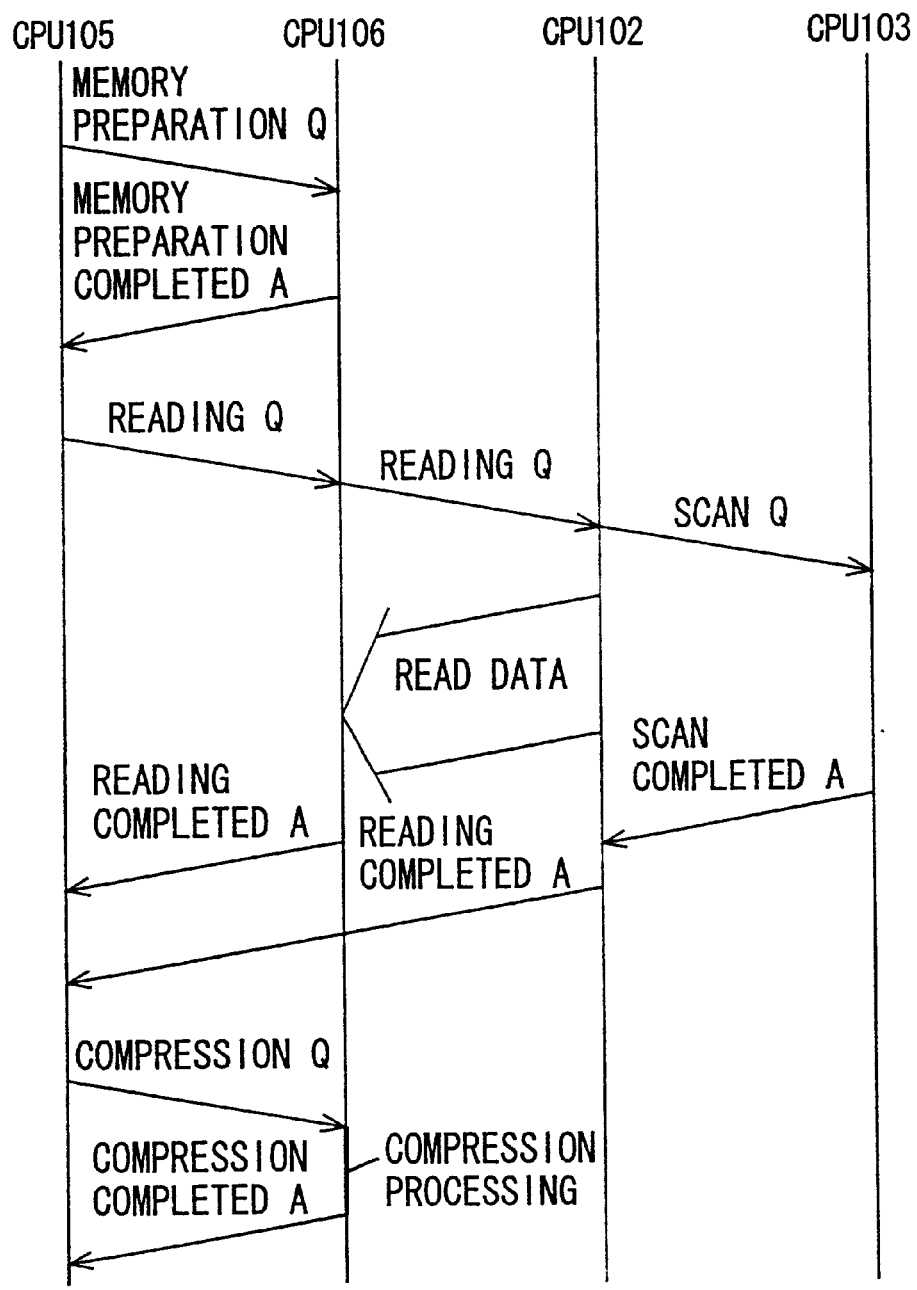
FIG. 10 shows a read/write operation sequence of the digital copying machine.
Figure 11:
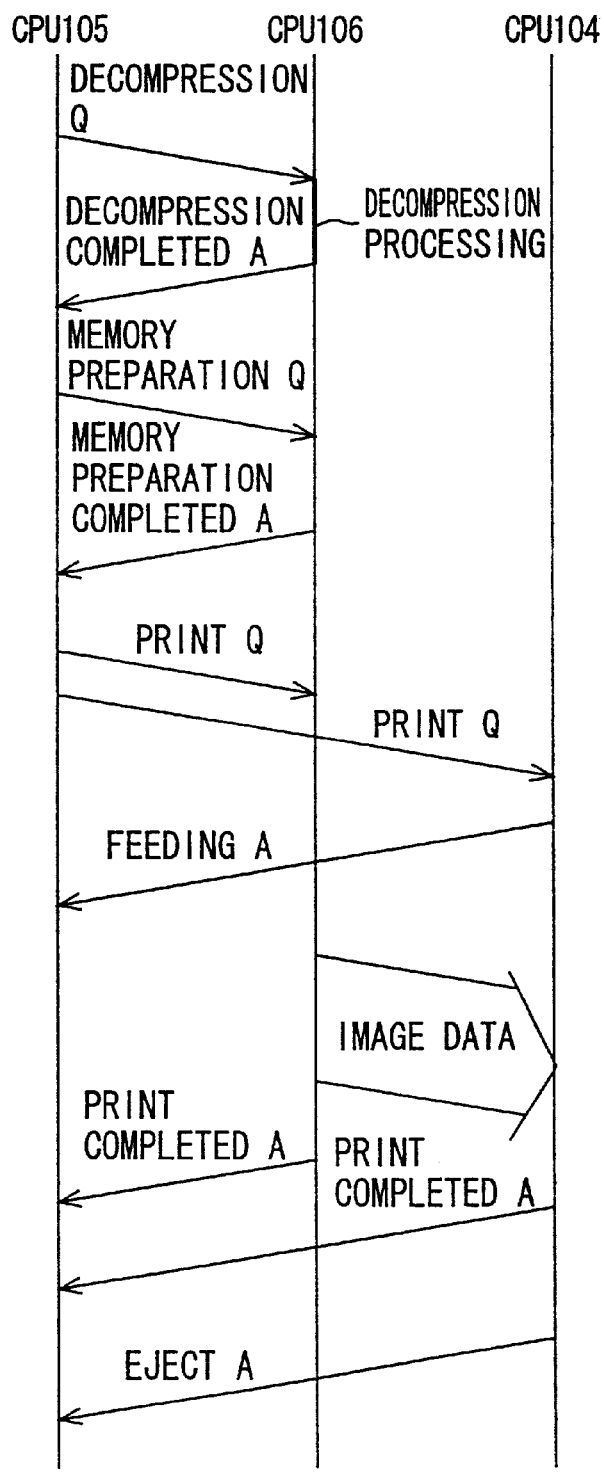
FIG. 11 shows a read-out/print operation sequence of the digital copying machine.

FIGS. 10 and 11 show a basic operation sequence of the digital copying machine in FIG. 1. A flow of request commands (Q), reports (A) and data which are exchanged among CPUs 101 to 106 will be mainly described in the following. In the figures, request commands and reports which are not important are not shown.

FIG. 10 shows an operation sequence of the read/write operation.

First, CPU 105 which manages the entire sequence outputs a request for memory preparation to CPU 106. In response, CPU 106 sets, for internal hardware, a mode for binarization (such as an error diffusion method, a threshold for erasing a background color), a starting address of a write region of image memory 304, XY length information, and so on.

When the setting is ended and the preparation is completed, a report indicating that memory preparation is completed is sent from CPU 106 to CPU 105. In response, CPU 105 sends a reading request to CPUs 106, 102, and CPU 102 also sends a scan request to CPU 103. Thus, scanning is initiated.

When scanner 19 reaches an image region of an original by scanning, read data (image data D2) is output to memory unit 30 in an image processing mode set by CPU 102. When the reading by scanning is completed, CPUs 106, 102 each send to CPU 105 a report indicating that the reading is completed.

Thereafter, CPU 105 sends a compression request to CPU 106 and, in response, CPU 106 sets an address for reading from image memory 304, XY length information, an address for writing to code memory 306, a mode of compressor 305 (MH method, for example), and the like, and activates compressor 311. Thus, the compression processing is caried out and code data is stored in code memory 306.

After the compression processing, a report indicating that the compression is completed is sent from CPU 106 to CPU 105.

FIG. 11 shows a sequence of an image data read-out/print operation.

In the read-out operation, image data is read out from image memory 304 and output to printer PRT and thus an image is printed on a sheet.

First, CPU 105 sends a decompression request to CPU 106. In response, CPU 106 sets an address for reading from code memory 306, a data amount, an address for writing to image memory 304, XY length information, a mode of decompressor 312 (MH method, for example), and the like, and activates decompressor 312. Thus, the decompression processing is carried out and image data is written to image memory 304.

After the decompression processing, CPU 106 sends to CPU 105 a report indicating that the decompression is completed. Then, CPU 105 sends to CPU 106 a memory preparation request to read out image data from image memory 304. In response, CPU 106 carries out, for internal hardware, setting of a circuit processing to output image data D3 from image memory 304 to print processing unit 40, setting of a starting address of the reading-out region of image memory 304 and XY length information, and so on.

When the setting is ended and the preparation is completed, CPU 106 sends to CPU 105 a report indicating that the memory preparation is completed. In response, CPU 105 sends a print request to CPUs 106, 104. CPU 104 sends to CPU 106 a sheet-feeding report for informing the transport state of a sheet, and thereafter image data D3 read out from image memory 304 is output to printer PRT and printing is carried out.

After printing, CPUs 106, 104 send to CPU 105 a report that the printing is completed and a report that the ejecting is completed. In response, CPU 105 outputs to CPU 106 a memory clear request or the like according to the operation mode.

In the following, an operation of the digital copying machine will be described with reference to flow charts. In the following, main routines performed by CPUs 101 to 107 will be first described in order and then sub routines for respective CPUs will be described.

Figure 12:
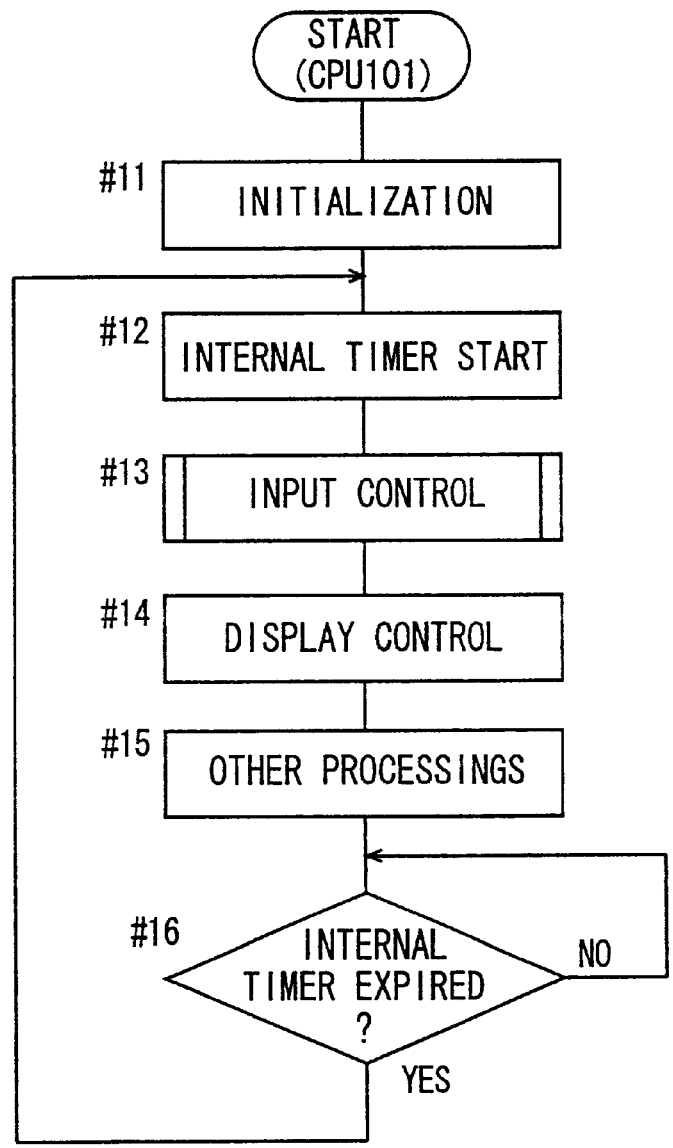
FIGS. 12 to 19 are flow charts showing main routines of CPUs 101 to 107.

FIG. 12 is a flow chart showing the main routine of CPU 101.

After CPU 101 first performs initialization (Step #11), it starts an internal timer and performs monitoring so that the routine time is constant (#12, 16). The description of the internal time also applies to CPUs 102 to 105, 107.

For operation panel 90, an input control processing and a display control processing are performed (#13, 14). Then, other processings are performed (#15). Further, communication with other CPUs 102 to 107 is performed by an interruption processing.

Figure 13:
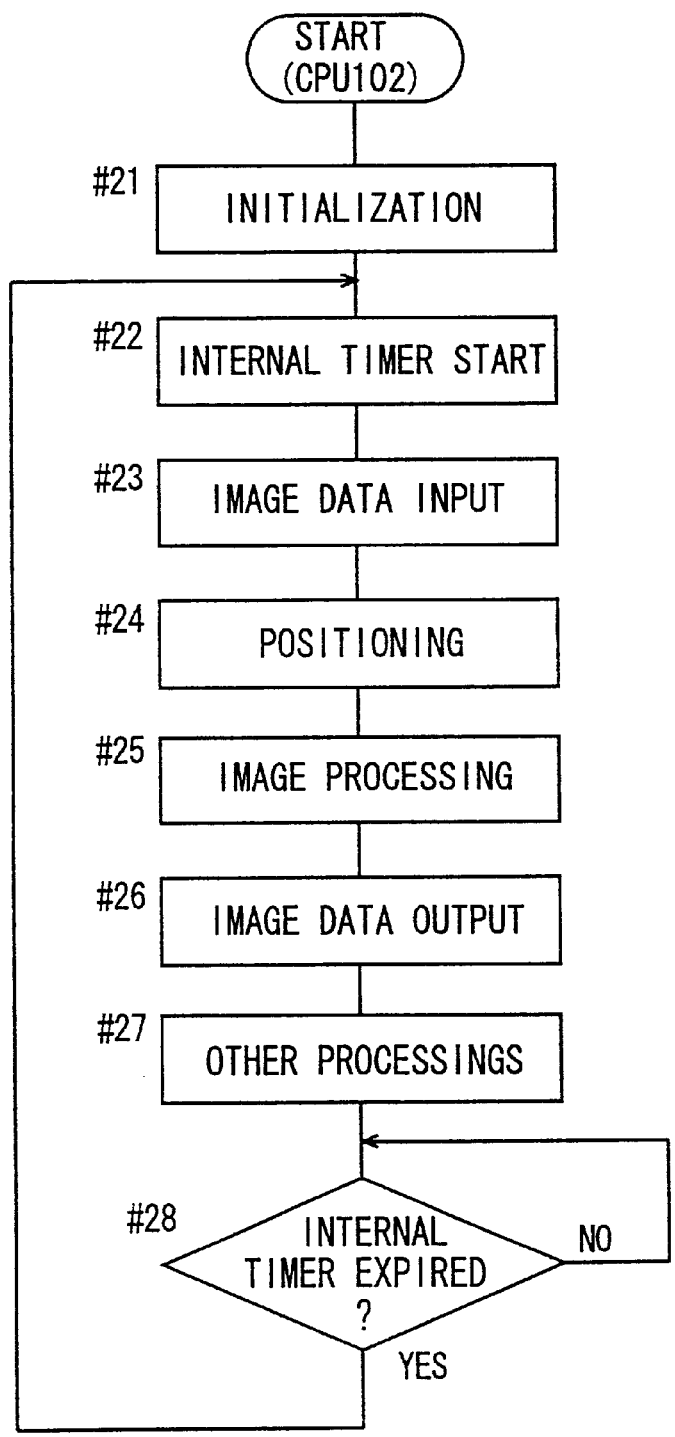

FIG. 13 is a flow chart of the main routine of CPU 102. Referring to FIG. 13, after CPU 102 first performs initialization (Step #21), it starts an internal timer and performs monitoring so that the routine time is constant (#22, 28). CPU 102 then performs an input processing of image data (#23) and then performs a positioning processing to offset a time difference caused by positional shift of CCD 16 (#24). Thereafter, CPU 102 performs an image processing, an image data output processing, and other processings (#25 to 27). Further, communication with other CPUs 101 to 107 is performed by an interruption processing.

Figure 14:
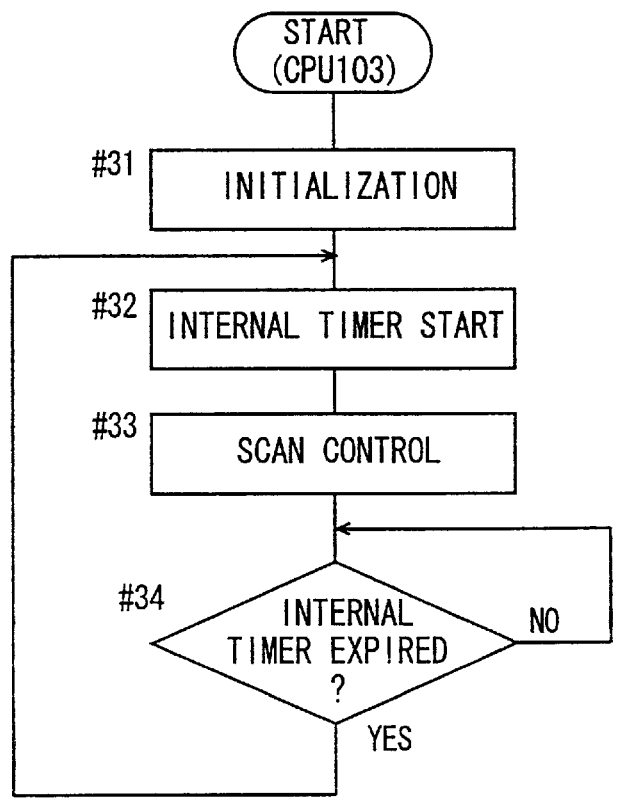

FIG. 14 is a flow chart of the main routine of CPU 103. Referring to FIG. 14, after CPU 103 first performs initialization (Step #31), it starts an internal timer and performs monitoring so that the routine time is constant (#32, 34). CPU 103 then performs scanning control to control read system 10 (#33).

Figure 15:
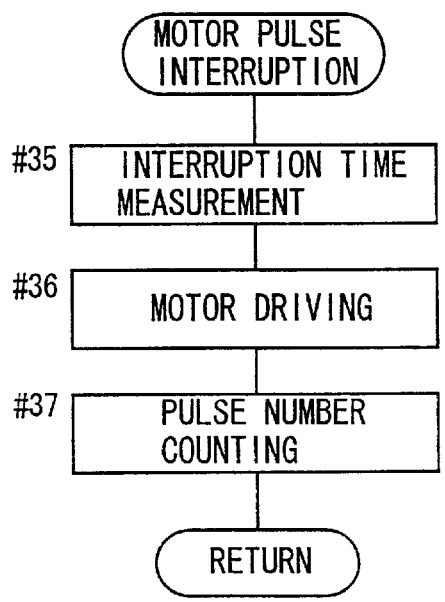

When an interruption by a motor pulse which is produced in synchronization with rotation of scan motor M2 is caused, a flow chart shown in FIG. 15 is carried out. Referring to FIG. 15, an interruption interval by a motor pulse is measured (#35), and power supply to the motor is turned on/off (driving of the motor) (#36). Then, the number of pulses in the motor is counted, for example (#37). Further, communication with CPU 102 is performed by interruption.

Figure 16:
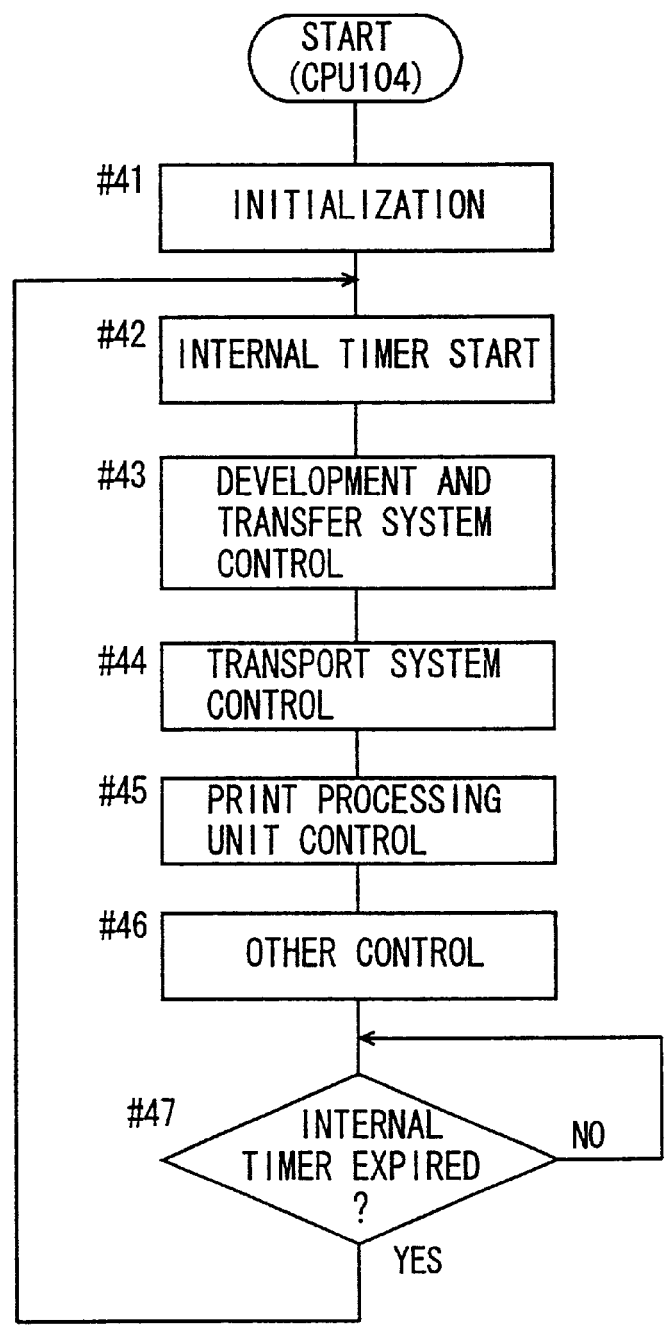

FIG. 16 is a flow chart of the main routine of CPU 104, which controls printer PRT. After CPU 104 first performs initialization (Step #41), it starts an internal timer and performs monitoring so that the routine time is constant (#42, 47). CPU 104 then first controls image forming system 70 (#43), controls transport system 80 (#44), controls print processing unit 40 (#45), and performs other processings (#46). Further, communication with other CPU 105 is performed by interruption.

Figure 17:
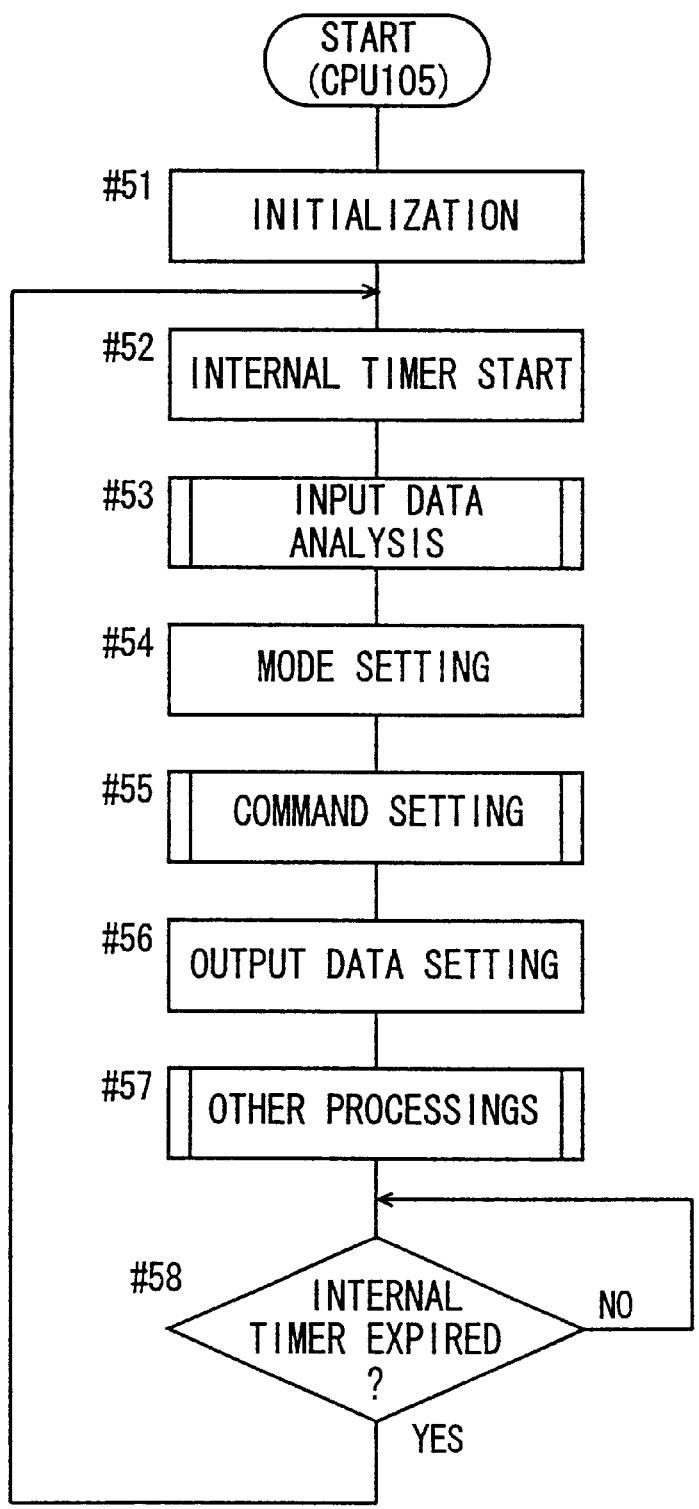

FIG. 17 is a flow chart of the main routine of CPU 105. CPU 105 sets the start and stop commands and the operation modes of other CPUs and controls operation of the entire copying machine. After CPU 105 first performs initialization (Step #51), it starts an internal timer and performs monitoring so that the routine time is constant (#52, 57). CPU 105 then first checks data which is input through communication for interruption and analyzes the contents (#53) and, if there is a change in the operation mode according to the contents, performs a mode setting processing (#54). Thereafter, CPU 105 performs command setting (#55). Further, it performs output data setting and other processings (#56, #57).

Figure 18:
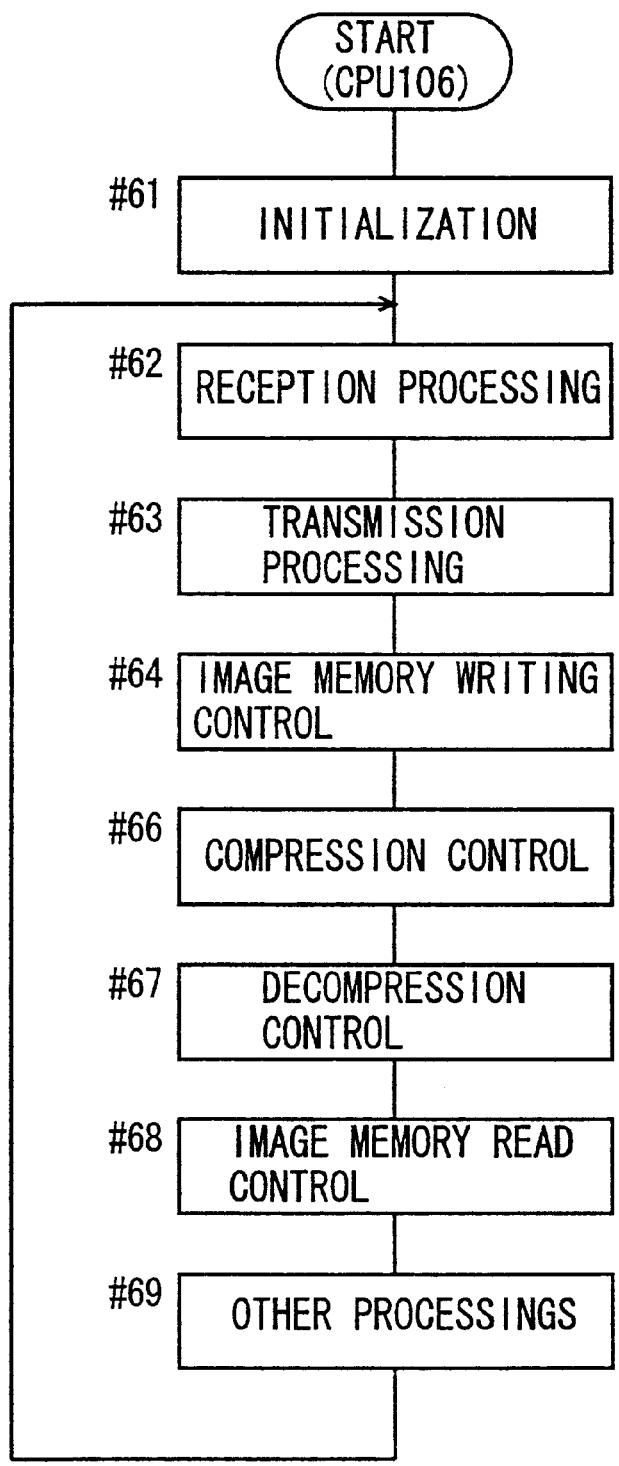

FIG. 18 is flow chart of the main routine of CPU 106, which controls memory unit 30. After CPU 106 first performs initialization (Step #61), CPU 106 performs a reception processing from other CPUs, a transmission processing for other CPUs (#62, 63), and writing control to the image memory (#64). Further, CPU 106 controls compression and decompression (#66, 67), controls reading from the image memory (#68), and performs other processings (#69).

Figure 19:
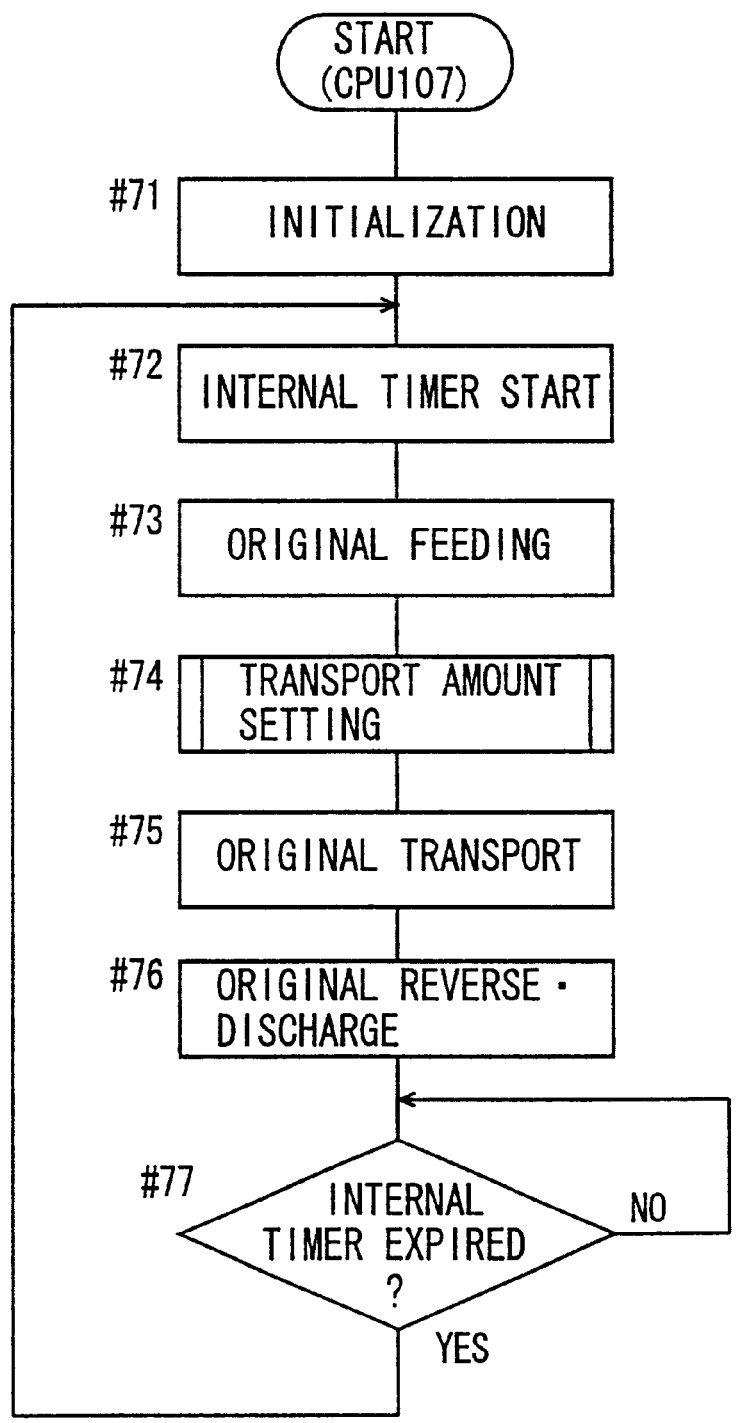

FIG. 19 is a flow chart of the main routine of CPU 107, which controls ADF 500. After CPU 107 first performs initialization (Step #71), it starts an internal timer and performs monitoring so that the routine time is constant (#72, 77). CPU 107 then first sorts originals to correct oblique feeding, performs an original feeding processing to control the transport of originals to transport belt 506 (#73), sets the amount of transport for transport belt 506 (#74), and performs an original transport processing to control the positioning of originals at a prescribed reading position by transport belt 506 and the transport of originals to reverse roller 507 (#75). Then, CPU 107 performs an original reverse and discharge processing to control whether the originals which have reached reverse roller 507 are to be discharged or transported again to transport belt 506 (#76).

Figure 20:
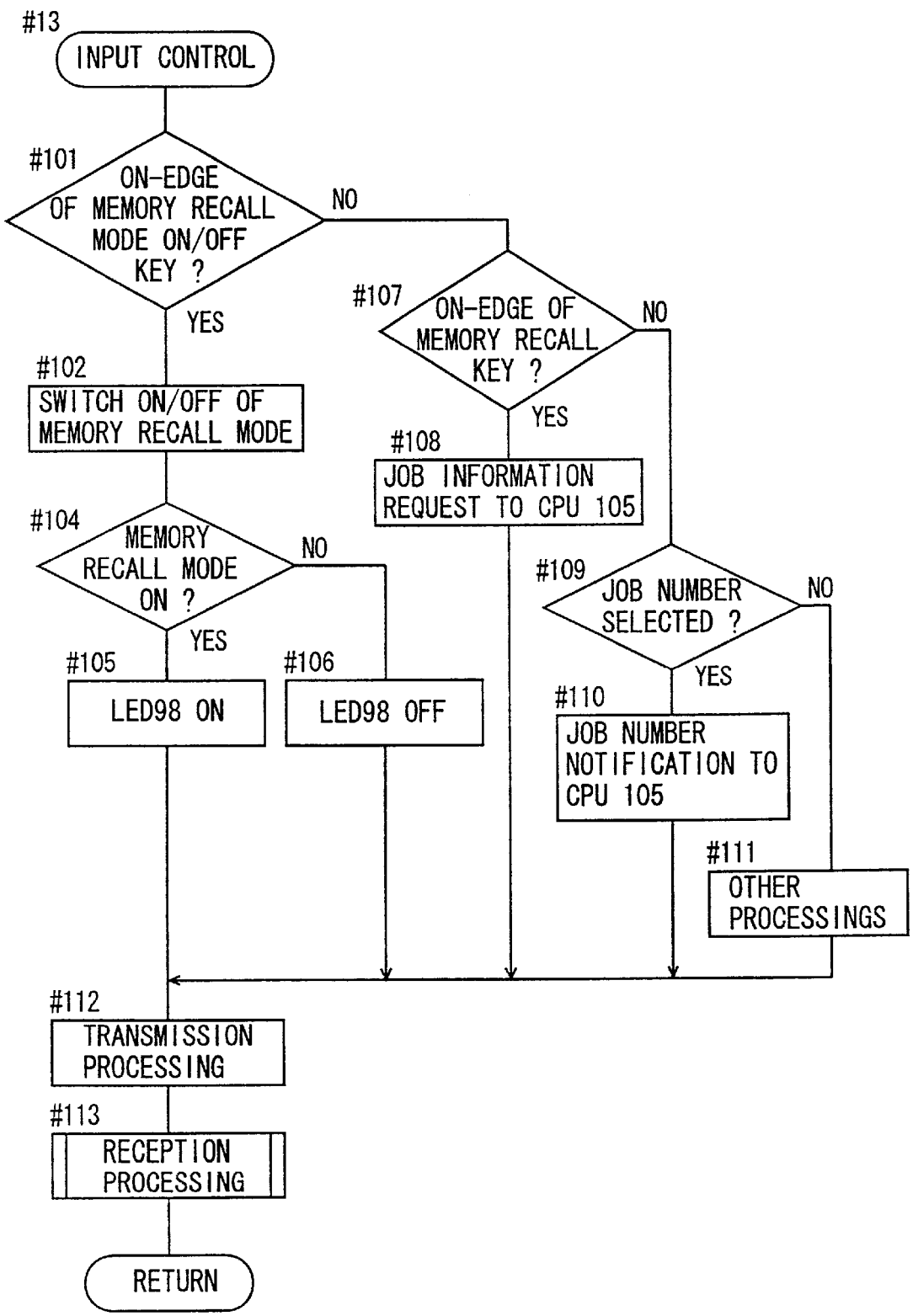
FIG. 20 is a flow chart of the input control processing (#13) in FIG. 12.

FIG. 20 is a flow chart showing the input control processing (#13) of CPU 101 in FIG. 12.

Referring to FIG. 20, whenever an on-edge of memory recall mode on/off key 97 is detected (YES in #101), on and off of the memory recall mode are alternately switched (#102), and whether the memory recall mode is on or off is displayed by turning on or off of LED 98. The on/off of memory recall key 99 is notified to CPU 105 by serial communication similarly to other copy modes (#112), and it is stored in panel table PT.

Specifically, if the memory recall mode is on (YES in #104), LED 98 is turned on, indicating that the memory recall mode is on (#105). If the memory recall mode is off (NO in #104), however, LED 98 is turned off, indicating that the memory recall mode is off (#106).

If an on-edge of memory recall key 99 is detected (YES in #107), CPU 105 is requested to read job information from the job management table (#108). This request is actually transmitted to CPU 105 by the transmission processing (#112). Thus, the job information is transmitted from CPU 105, and liquid crystal touch panel 91 displays, as shown in FIG. 21, the job number (IST number) registered in the job management table (FIG. 8), the number of originals (calculated from the top and last image IDs), and the job registered time in this order.

Figure 21:
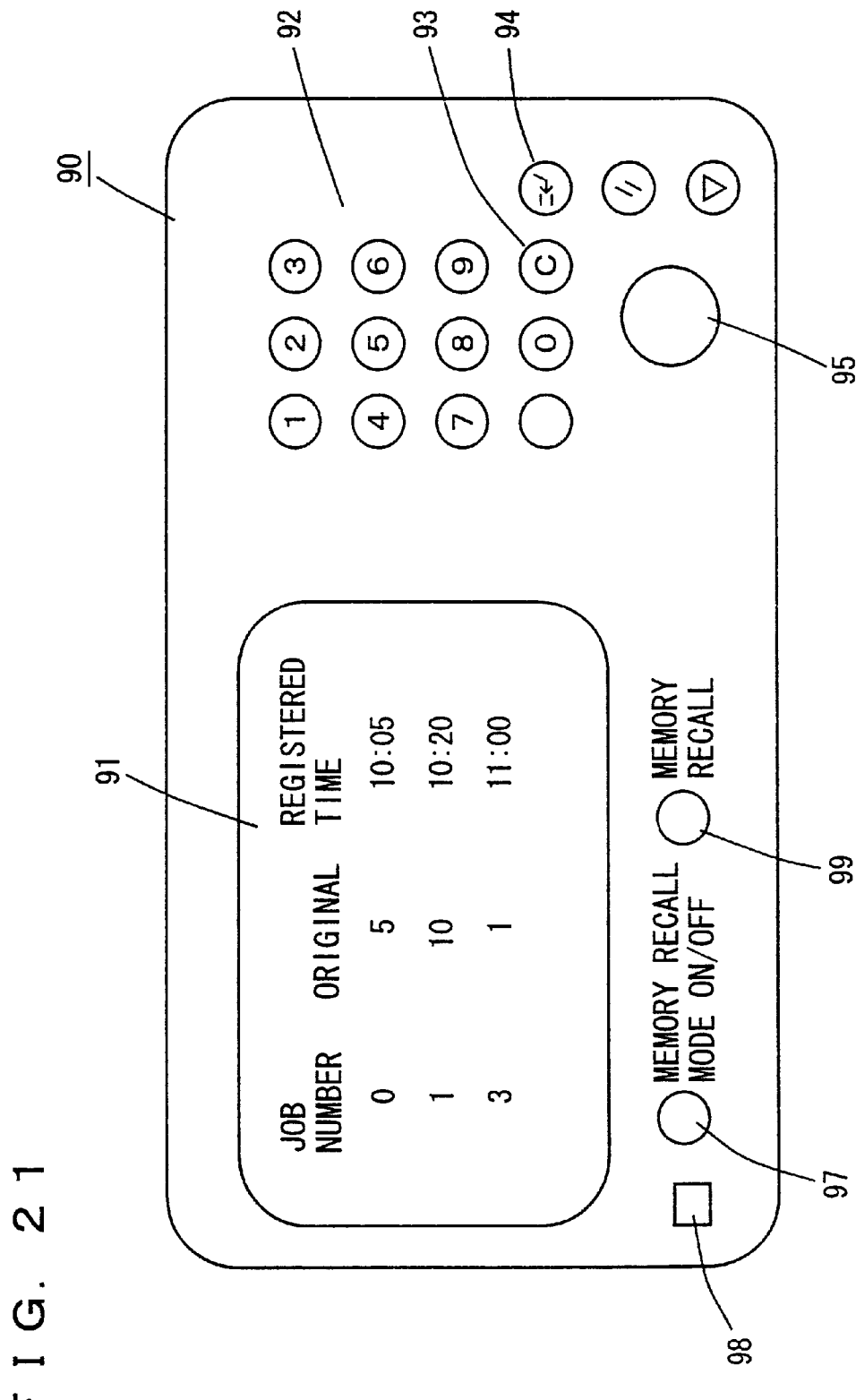
FIG. 21 is a plan view showing the state of the operation panel after a memory recall key is pressed down.

Referring again to FIG. 20, if a job number is selected by key input while the contents shown in FIG. 21 are displayed on the liquid crystal touch panel (YES in #109), CPU 105 is notified of the job number (#110). If there is another input, a processing corresponding to the key input is performed (#111). In the end, CPU 101 processes transmission (#112) and reception (#113) by serial communication.

Figure 22:
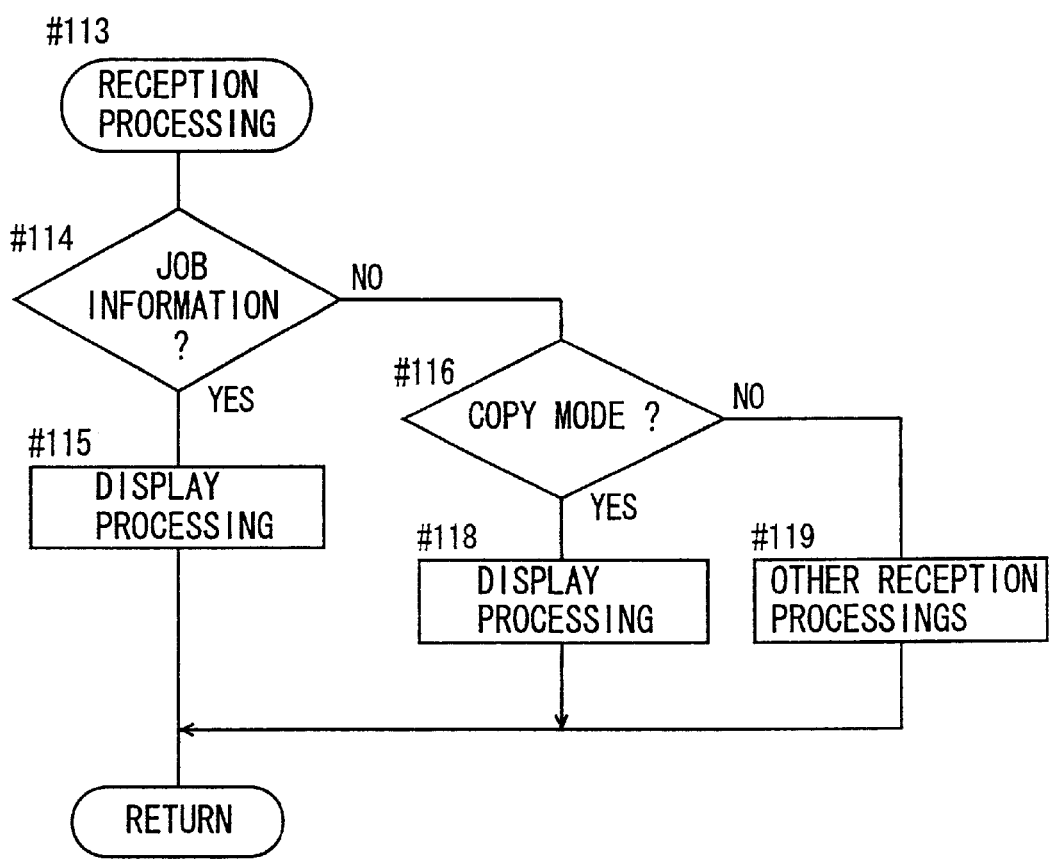
FIG. 22 is a flow chart of the reception processing (#113) in FIG. 20.

FIG. 22 is a flow chart showing the reception processing (#113) shown in FIG. 20. Referring to FIG. 22, if the job information requested in step #108 in FIG. 20 is received by CPU 105 (YES in #114), a registered job is displayed on the liquid crystal tough panel (#115) as shown in FIG. 21. If the copy mode is notified from CPU 105 (YES in #116), displaying is performed according to the notified copy mode (#118). If there is another reception, a processing according to the received data is performed (#119).

Figure 23:
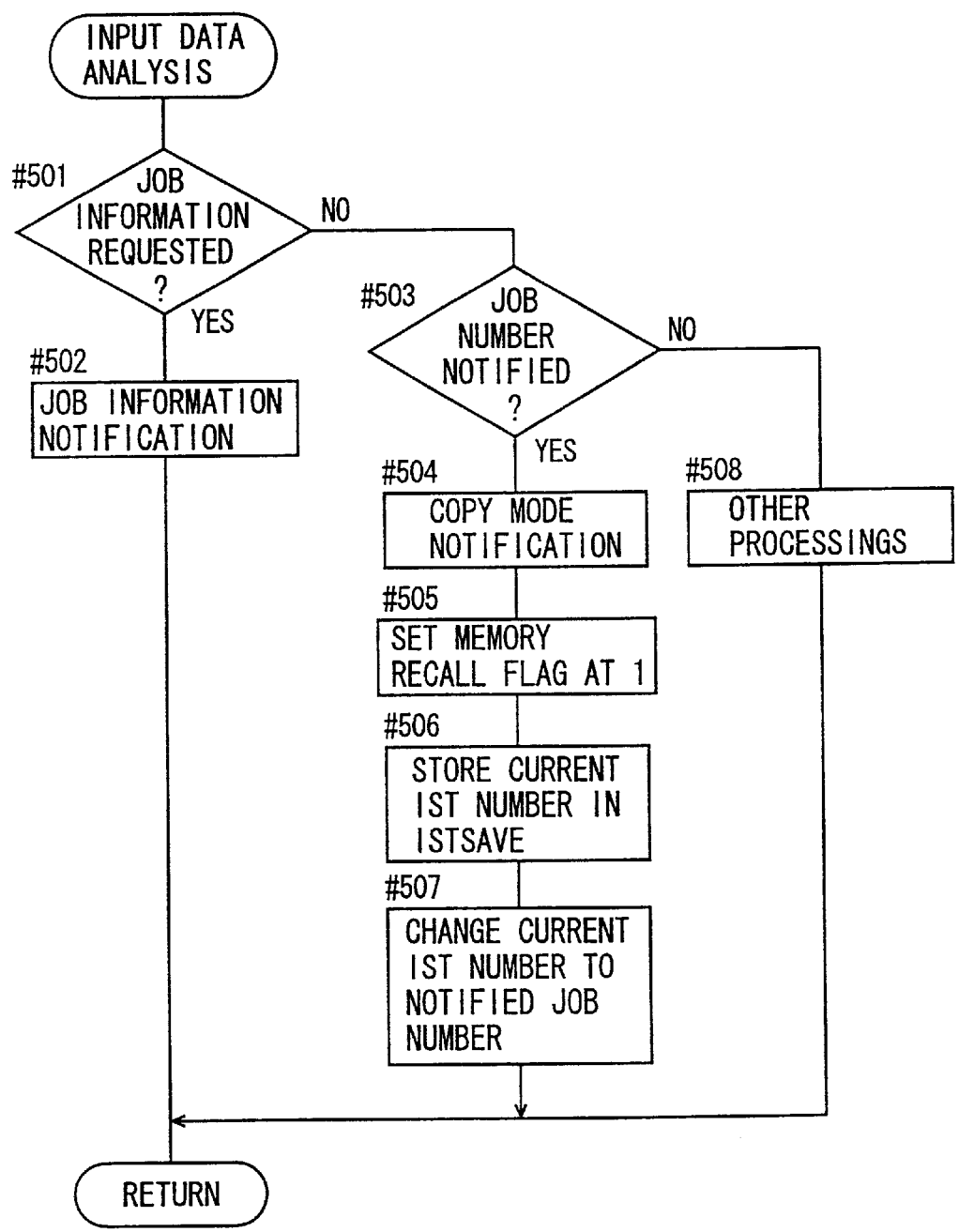
FIG. 23 is a flow chart of the input data analysis (#53) in FIG. 17.

FIG. 23 is a flow chart showing the input data analysis processing (#53) of CPU 105 in FIG. 17. Referring to FIG. 23, if job information is 20 requested from CPU 101 (YES in #501), the job number, the number of originals, and the registered time of the job are notified from the tables shown in FIGS. 8 and 9 to CPU 101 (#502). If the job number is notified from CPU 101 (YES in #503), a copy mode corresponding to the job number is notified to CPU 101 by referring to the tables shown in FIGS. 8 and 9 (#504). Then, a memory recall flag is set at "1" (#505). Further, the current IST number is temporarily stored in a variable ISTSAVE (#506). Then, the current IST number is changed to the job number notified from CPU 101 (#507).

In the input data analysis processing, a copy mode corresponding to the job indicated by the current IST number is read out from panel table PT and stored, as other processings (#508).

It is noted that the current IST number is a number corresponding to the job which is to be processed among job numbers (IST numbers) in the job management table shown in FIG. 8.

Figure 24:
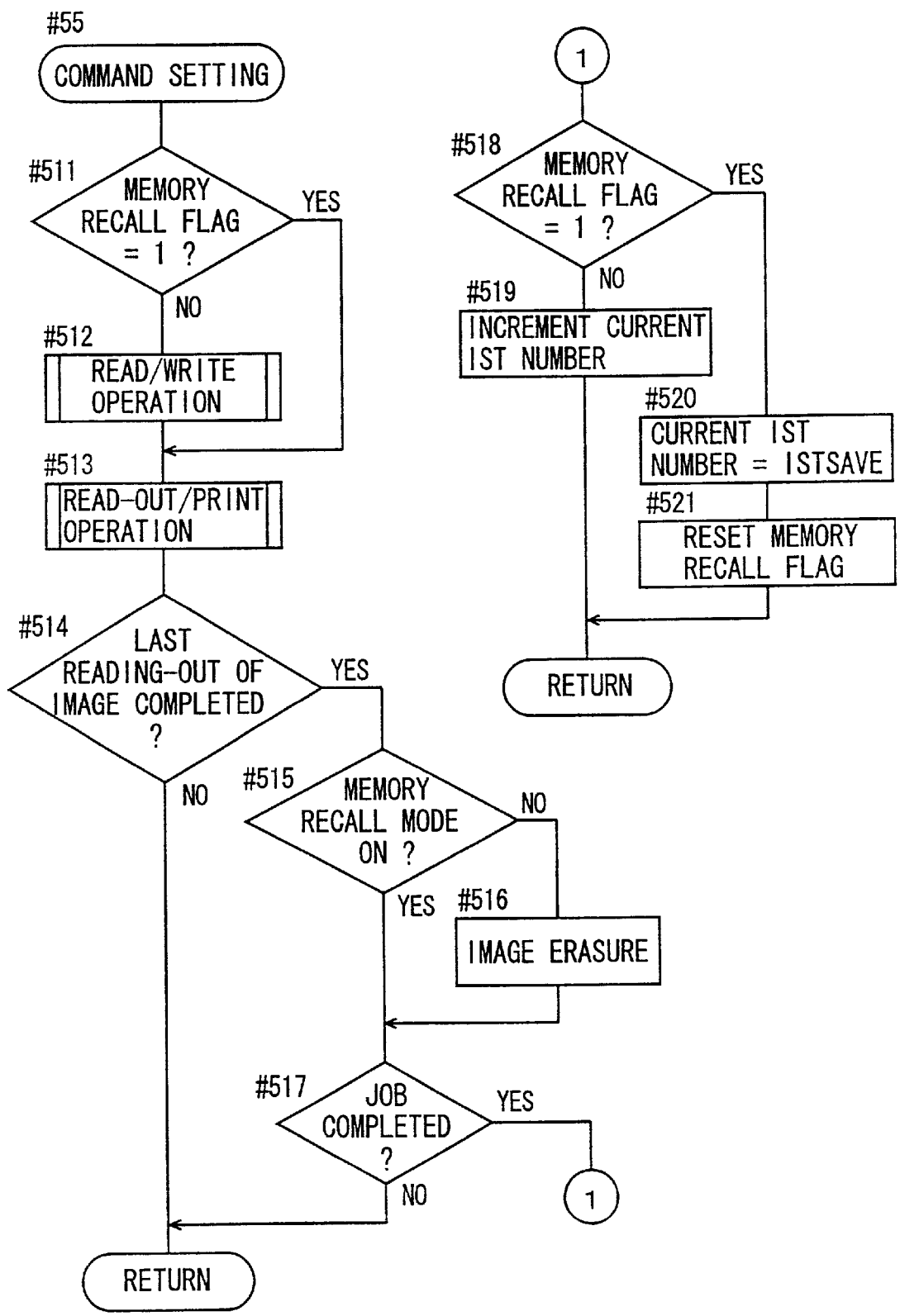
FIG. 24 is a flow chart of the command setting (#55) in FIG. 17.

FIG. 24 is a flow chart showing the command setting processing (#55) of CPU 105 in FIG. 17. If the memory recall flag is not set at "1" (NO in #511), image data is read by image reader IR and written to a read memory (#512). Thereafter, the image data stored in the memory is read out and printed (#513).

If the memory recall flag is set at "1" (YES in #511), however, a readout/print operation is directly entered without reading an original (#513). Whether or not the read-out operation is completed is determined from an eject completion report, a copy mode, and so on. If reading-out is completed (YES in #514), whether or not the memory recall mode is on is determined (#515). If the memory recall mode is off (NO in #515), CPU 106 is instructed to erase the read-out image from the memory (#516).

Thus, original information is not maintained when a user turns off the memory recall mode, and the user can keep the secrecy of originals.

Then, whether or not the job (print operation, herein) is completed is determined. If the job is completed (YES in #517), whether or not the memory recall flag is "1" is determined (#518). If the memory recall flag is not "1" (NO in #518), the current 1ST number is incremented by one (#519). Thus, a job correspond to the next 1ST number is performed.

If the memory recall flag is "1" (YES in #518), however, a numerical value registered in variable 1STSAVE is substituted in the current 1ST number (#520). Thus, the 1ST number used before memory recall is used for the next job. Thereafter, the memory recall flag is reset at "0" (#521).

In the read-out operation when memory recall is performed, a mode of a copying machine is set according to a copy mode obtained from an IST number which corresponds to a job to be recalled, and therefore the copy mode when the job is set in the copying machine can be reproduced. Further, original image data of a job to be recalled can be specified based on the top and last image IDs of the job corresponding to the IST number.

Figure 25:
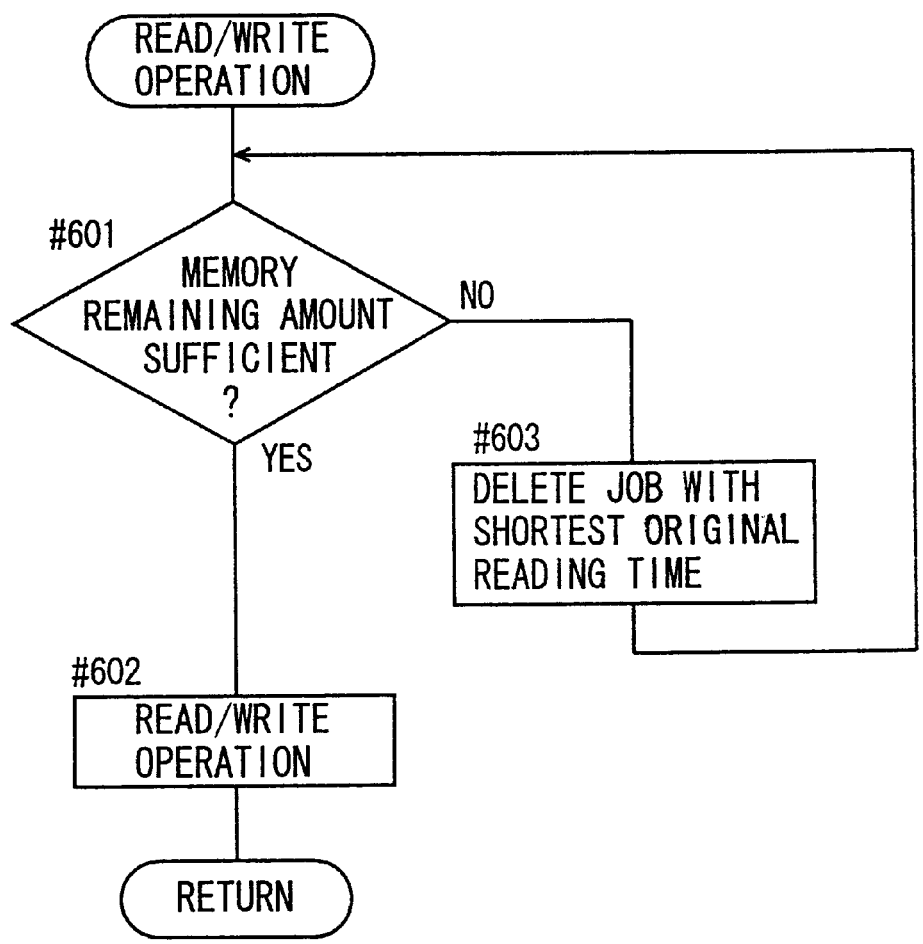
FIG. 25 is a flow chart of the read/write operation (#512) in FIG. 24.

FIG. 25 is a flow chart showing a processing in the read/write operation (#512) in FIG. 24. Referring to FIG. 25, whether or not the remaining amount of code memory 306 is sufficient to store image data is determined (#601). If the remaining amount is sufficient (YES in #601), an original is read and a write operation for storing the original in code memory 306 is performed (#602). Here, the contents of a job are written along with the image in the job management table shown in FIG. 8.

If the remaining amount of the memory is insufficient (NO in #601), however, the original reading time in the job management table in FIG. 8 is read out for all the registered jobs. Then, a job with the shortest original reading time is specified, the image data of the job is deleted from code memory 306, and the job is deleted from the job management table at the same time. Then, the processing advances to step #601, and the operation of step #603 is repeated until the result of step #601 becomes YES.

In this embodiment, when the remaining amount of the memory is insufficient in reading images, image data are deleted from the one of which job has the shortest original reading time. This is because the job with the shortest original reading time does not require longer time and is not troublesome for a user even if it is deleted from the memory and read again. In this embodiment, if the memory remaining amount is still insufficient after data of the job with the shortest original reading time is deleted, a job with the second shortest reading time is deleted, and so on. Thus, image data can be deleted until the memory remaining amount is sufficient.

In this embodiment, a determination is made as to whether the remaining amount of the memory is sufficient. Instead, whether or not the memory stores data of a prescribed amount or more may be determined, and data may be deleted from the memory when data of at least the prescribed amount is stored.

Figure 26:
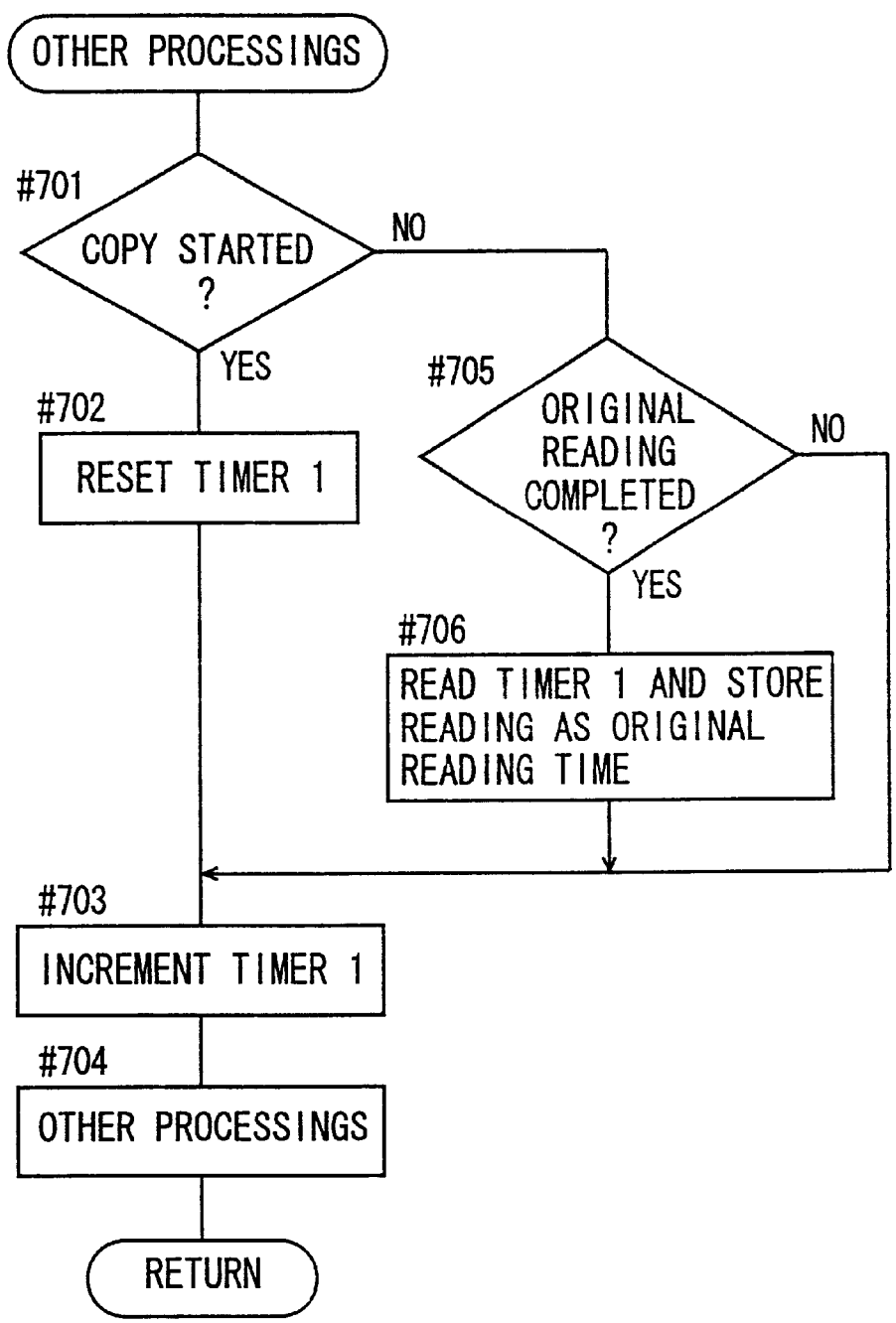
FIG. 26 is a flow chart of other processings (#57) in FIG. 17.

FIG. 26 is a flow chart of other processings (#57) in FIG. 17. Referring to FIG. 26, whether or not a request to start copying has been made is first determined in other processings (#701). If the request has been made, a timer 1 for measuring original reading time is reset (#702). Then, timer 1 is incremented (#703) and other processings are performed (#704).

If the copy start request has not been made (NO in #701), however, whether or not original reading has been completed is determined (#705). If it has, timer 1 is counted and the result is recorded in the column of original reading time of the job management table in FIG. 8 (#706).

In this manner, the original reading time of the job can be recorded in the job management table.

Second Embodiment

Since the device structure of a digital copying machine in a second embodiment of the present invention is the same as the first embodiment, the description will not be repeated. For the digital copying machine in the second embodiment, a step #515a shown in FIG. 27 is performed instead of step #515 of the flow chart for command setting shown in FIG. 24.

Figure 27:
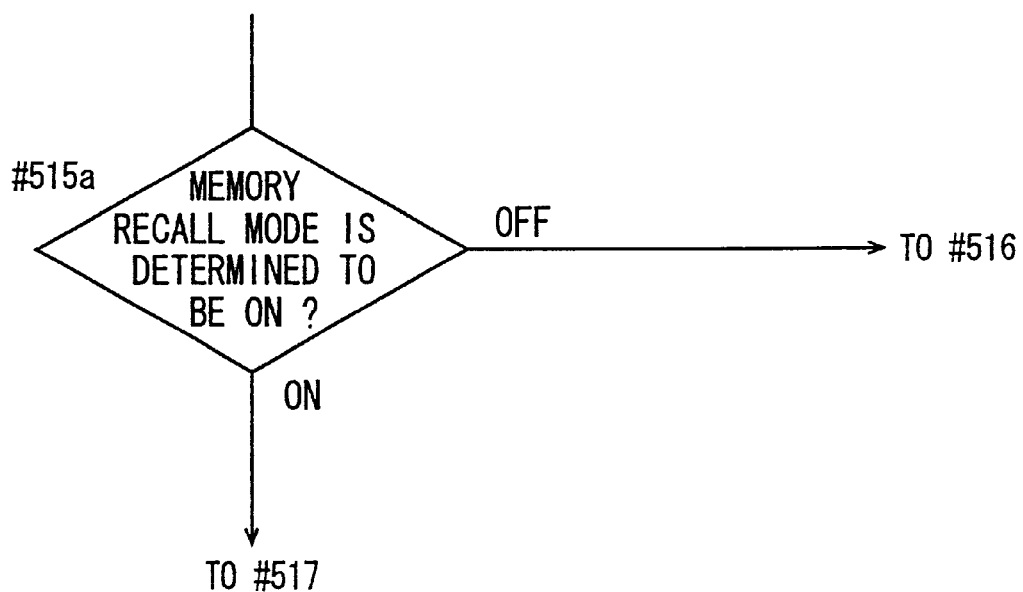
FIG. 27 is a flow chart showing a processing of a digital copying machine in a second embodiment of the present invention.

Referring to FIG. 27, a determination is made in step #515a as to whether or not to turn on the memory recall mode in CPU 105 of the digital copying machine. If the memory recall mode is not turned on, step #516 is entered. If the memory recall mode is turned on, step #517 is entered. In other words, whether or not to turn on the memory recall mode is determined not by a user but by the digital copying machine itself considering the characteristics of image data in this embodiment. Therefore, a job which is better to be stored in the memory is automatically stored in the memory while a job which does not have particular problems even if not stored is not stored in the memory.

The determination as to whether or not to turn on the memory recall mode in step #515a can be made under the following conditions.

(1) A job which corresponds to image data read by read system 10 is stored by turning on the memory recall mode, and a job which corresponds to data from an external device which is input through external interface 31 is not stored. This is because the owner of a job is not known when a digital copying machine is used as a printer, and therefore whether or not to delete it is difficult to determine.

(2) When the present invention is applied to a digital copying machine to which one's ID number (or the number of a section to which the person belongs) is input using a ten key or a key card before job application, a job applied when an ID number is input using the ten key is stored in the memory and a job applied when an ID number is input using the key card is not stored in the memory.

(3) A job of which printing can be started only after all originals are read (for example, a job for magazine binding) is stored, and a job which can be printed while originals are read (a job for ordinary copying operation) is not stored. This is because a job which can be printed while originals are read is less troublesome for a user even if the originals are read again.

(4) A job to which an interrupt reading mode is set may be stored. The interrupt reading mode is a function of reading originals in two separate groups, and linking the groups as one group in the memory before printing. Such a job is also difficult for a user to read.

(5) A job to which a book original mode is set may be stored. The book original mode is a mode of reading each page of a book as an original image. In the book original mode, a user causes all pages to be read before printing. This is because even in such a book original mode, reading is troublesome for a user and therefore it is better to store each page in the memory.

(6) When an ADF having a function of stapling originals after reading them is used, the job may be stored if the originals are stapled. This is because when the originals are read again, removing staples from the originals is necessary and it is troublesome for a user.

(7) A job which is read using single feeding (hand feeding) may be stored. This is because originals which are read using single feeding includes special ones which are easily torn. This is carried out to prevent damage to originals when they are read again.

(8) A job of which reading time exceeds a prescribed value based on the result of measuring original reading time may be stored. This is because reading originals which require longer reading time is troublesome for a user.

Third Embodiment

Since the hardware structure of a digital copying machine in a third embodiment is the same as the first embodiment, the description will not be repeated. In this embodiment, the read/write operation shown in FIG. 28 is performed instead of the read/write operation in FIG. 25.

Figure 28:
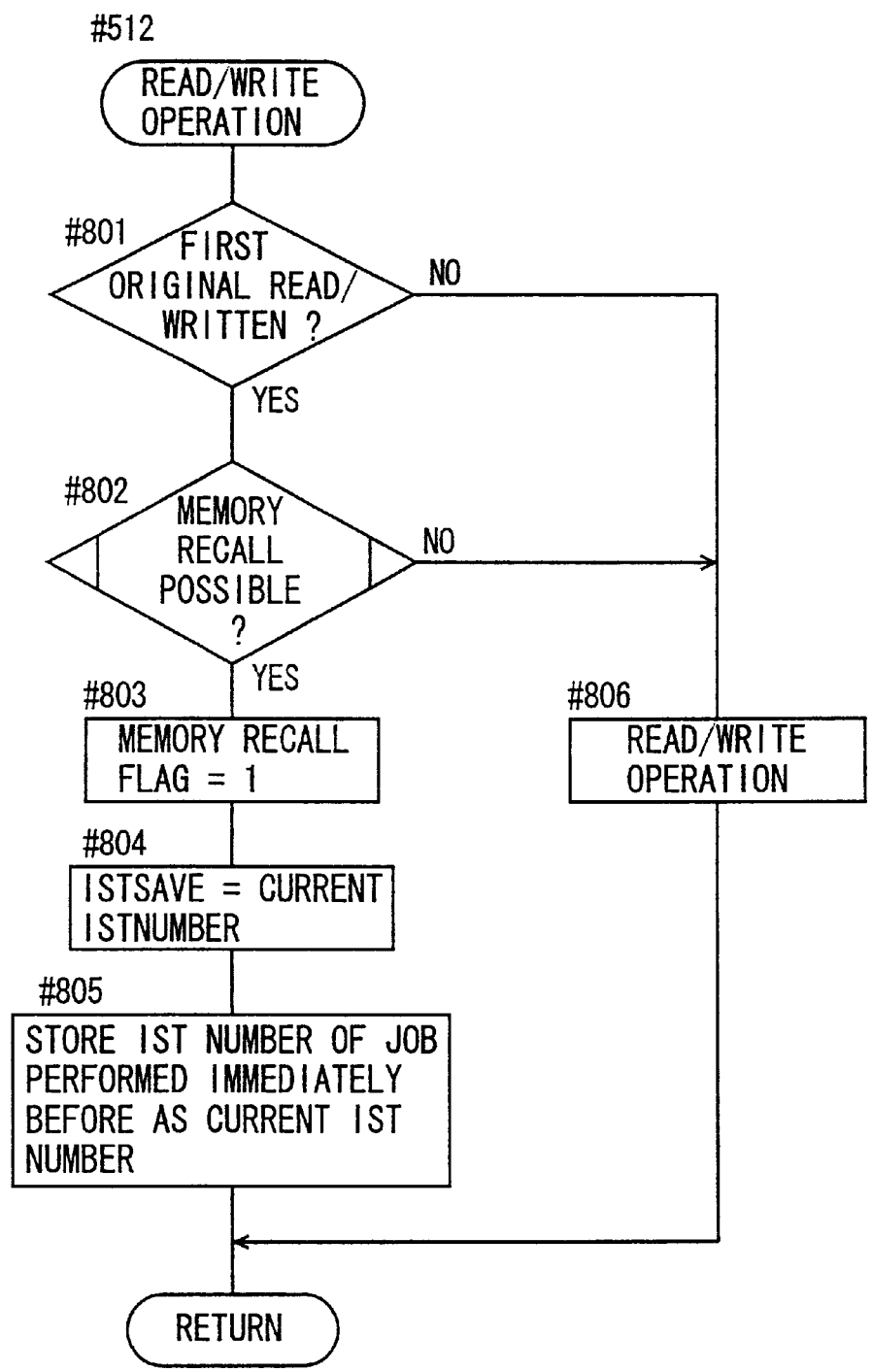
FIG. 28 is a flow chart showing a processing of a digital copying machine in a third embodiment of the present invention.

Referring to FIG. 28, a determination is made as to whether the read/write operation corresponds to the first original of the job (#801). If it is the read/write operation for the first original of the job (YES in #801), a determination is made as to whether automatic memory recall is possible without reading/writing the original of the job (#802). If automatic memory recall is possible (YES in #802), the memory recall flag is set at "1" (#803) and the current IST number is substituted in variable ISTSAVE (#804). Then, the IST number of a job performed immediately before is substituted in the current IST number, and the job is read out/printed (#805).

If the read/write operation is not for the first original of the job (NO in #801) or memory recall is impossible (NO in #802), a normal read/write operation is performed (#806).

Figure 29:
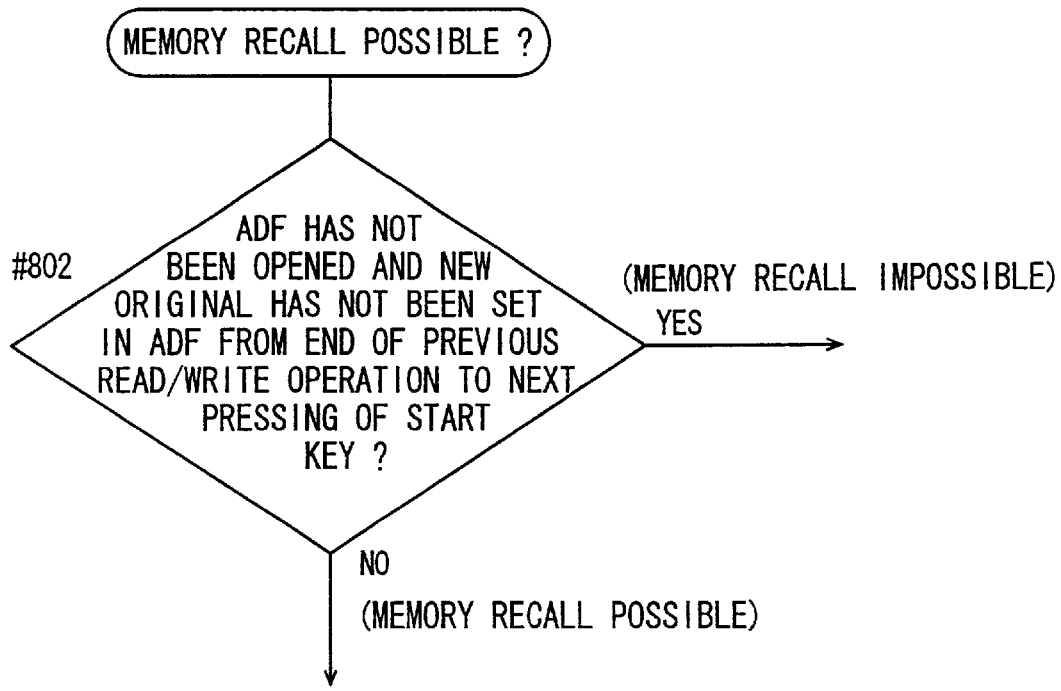
FIG. 29 is a flow chart of the memory recall determination (#802) in FIG. 28.

FIG. 29 is a flow chart showing the specific contents of the memory recall determination processing (#802) in FIG. 28. Referring to FIG. 29, in step #802, a determination is made as to whether the ADF has not been opened and new originals have not been set in the ADF from the end of the previous read/write operation to the next pressing of the start key. If the result is NO, memory recall is determined to be possible. Otherwise, memory recall is determined to be impossible.

If the ADF has not been opened and new originals have not be set in the ADF from the end of previous read/write operation to the next pressing of the start key, new originals have not been set in the digital copying machine. Therefore, image data written for the previous job is recalled. Thus, when image data for a previously read job is to be printed again, a user does not have to provide an input for memory recall and only have to press down the copy start key. Therefore, the operability of the digital copying machine can be improved.

Figure 48:
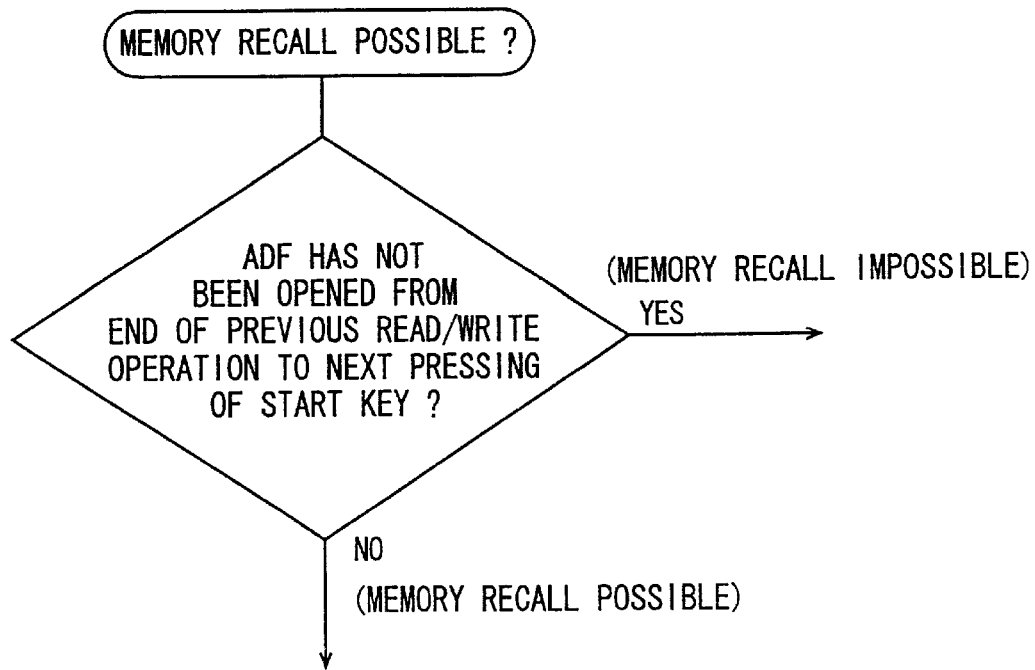
FIGS. 48 and 49 are flow charts showing variations of the processing in FIG. 29.
Figure 49:
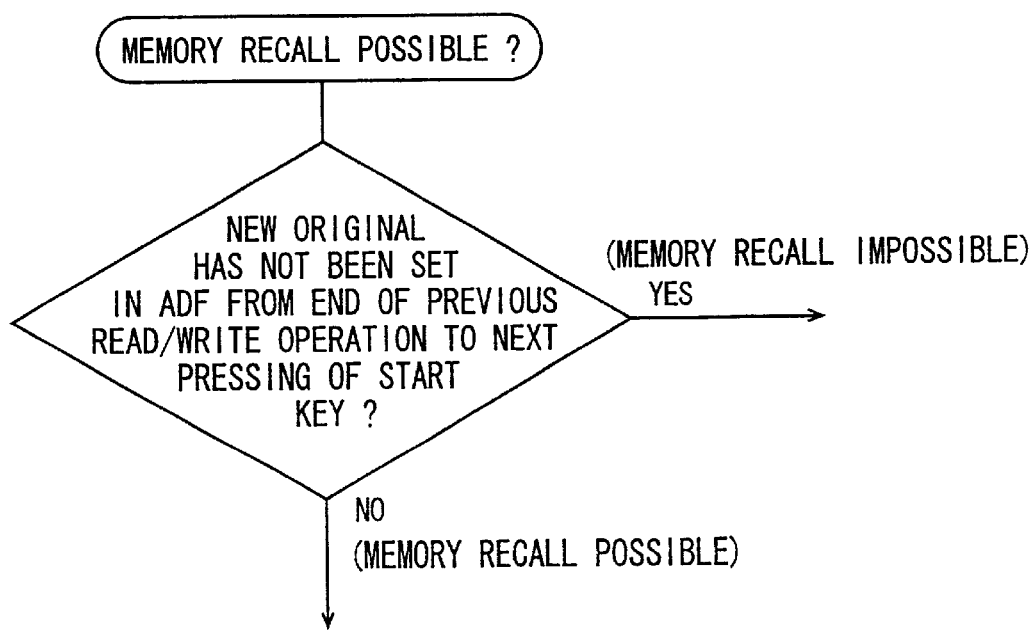

Instead of the processing of FIG. 29, the processing of FIG. 48 or FIG. 49 may be adapted.

In FIG. 48, a determination is made as to whether the ADF has been opened from the end of the previous read/write operation to the next pressing of the start key.

In FIG. 49, similarly, a determination is made as to whether new originals have been set in the ADF.

The present invention can also be applied to a digital copying machine which does not include an ADF and only has a original cover capable of opening and closing. In this case, the flow chart shown in FIG. 30 may be performed instead of the flow chart shown in FIG. 29.

Figure 30:
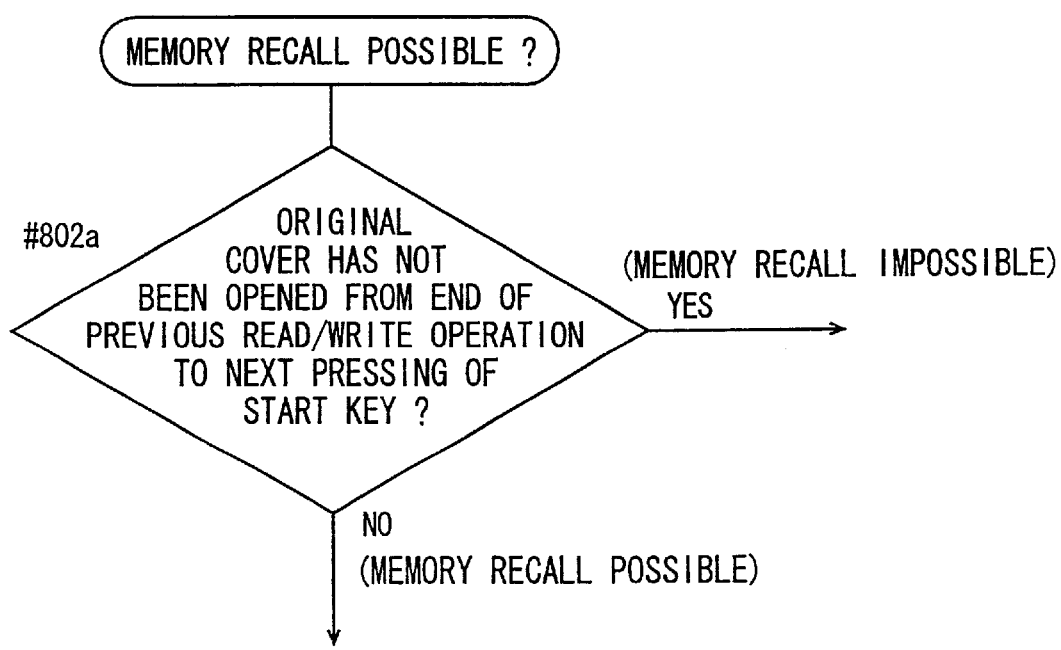
FIG. 30 is a flow chart showing a variation of the flow chart in FIG. 29.

Referring to FIG. 30, in step #802a, a determination is made as to whether the original cover has not been opened from the end of the previous read/write operation to the next pressing of the start key. If the result is NO, memory recall is determined to be possible. If it is YES, memory recall is determined to be impossible.

If the original cover has not been opened from the end of the previous read/write operation to the next pressing of the start key, previous originals have been placed on the platen glass. In this case, the processing in FIG. 30 shortens the original reading time by recalling the image data of the previous job recorded in the memory without reading the original again.

Figure 31:
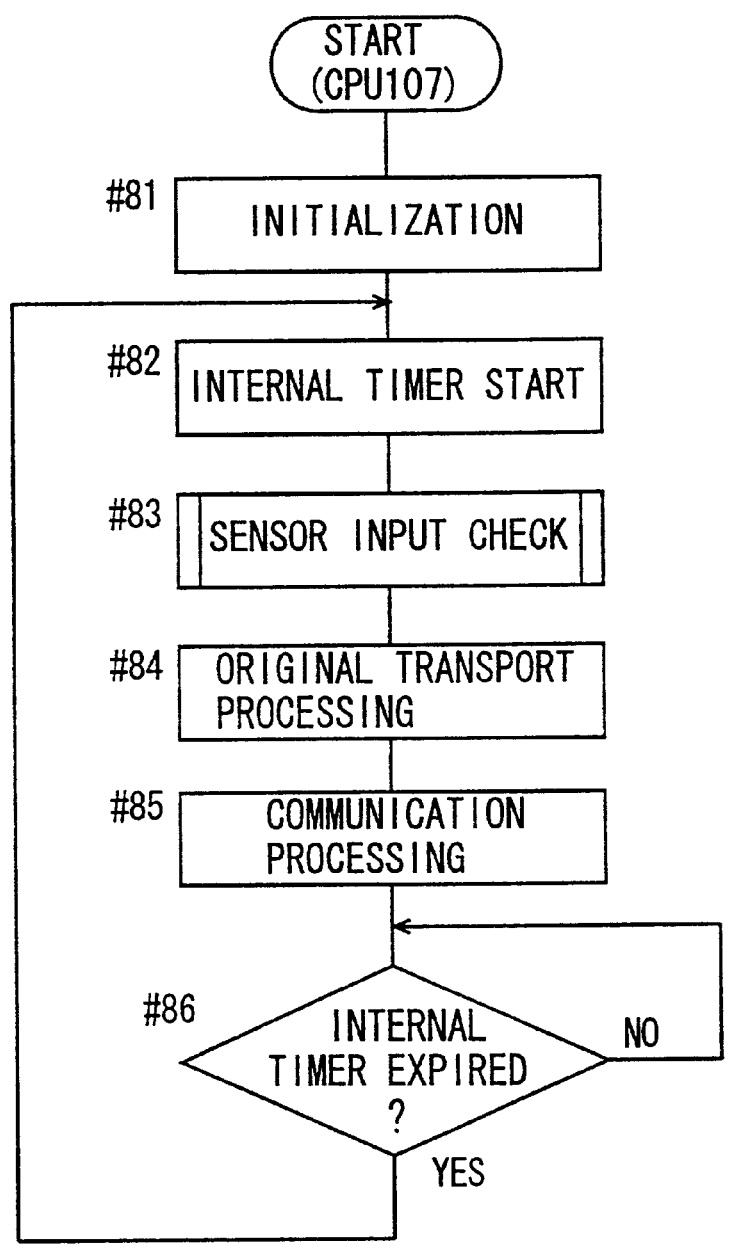
FIG. 31 is a flow chart showing a processing of a CPU 107 in the third embodiment.

In this embodiment, the flow chart shown in FIG. 31 is performed instead of the processing of CPU 107 shown in FIG. 19. Referring to FIG. 31, CPU 107 performs initialization and starts an internal timer (#81, #82), and checks inputs from various sensors (#83). Thereafter, CPU 107 performs a processing for transporting originals (#84) and communication with other CPUs (#85), waits for the expiration of the internal timer (#86), and returns to step (#82).

Figure 32:
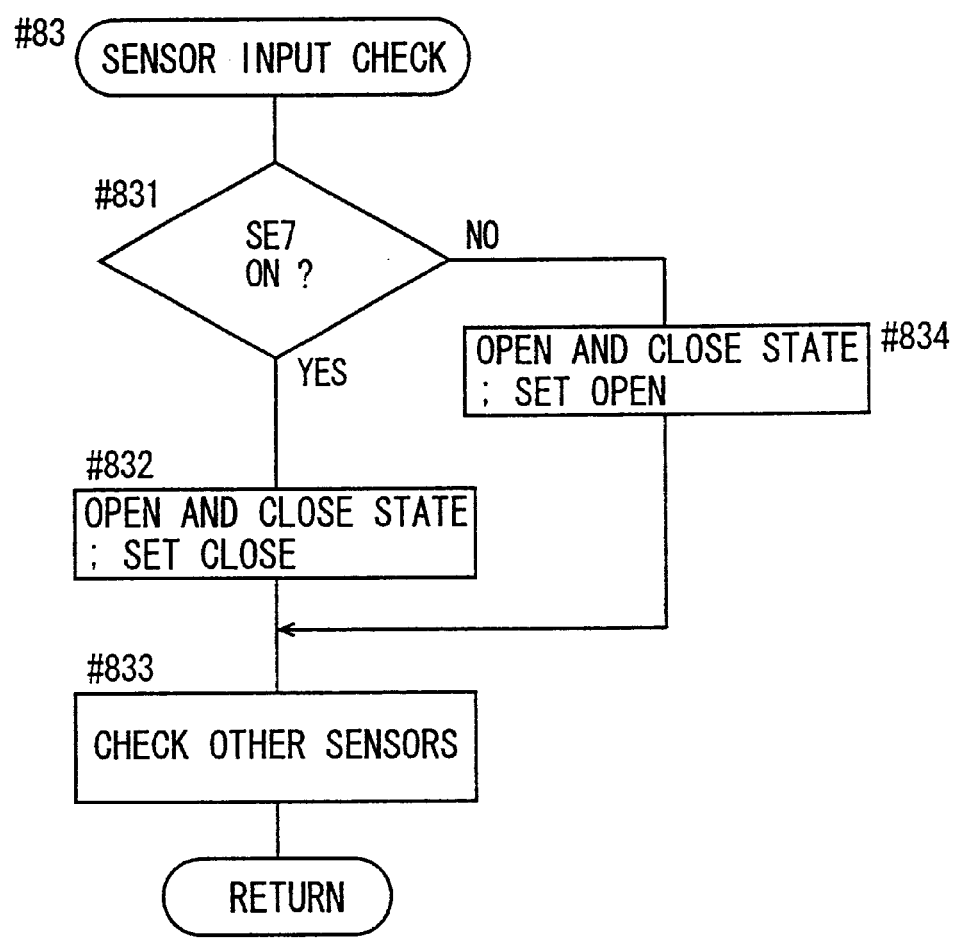
FIG. 32 is a flow chart of the sensor input check (#83) in FIG. 31.

FIG. 32 is a flow chart showing a sub routine of the sensor input checking processing (#83) in FIG. 31. Referring to FIG. 32, if sensor SE7 (see FIG. 1) is on in step #831, it is determined that an original has been set in the ADF (#832) and, otherwise, it is determined that an original has not been set in the ADF (#834). In step #831, whether or not sensor SE7 is on is determined. As described above, sensor SE7 senses opening and closing of ADF 500. If sensor SE7 is on, ADF 500 is in a closed state.

If the result of step #831 is YES, ADF 500 is closed in step #832. Thereafter, other sensors are checked in #833 and the processing returns to the main routine.

If the result is NO in step #831, however, ADF 500 is opened in step #834 and the processing advances to step #833.

Fourth Embodiment

Since the hardware structure of a digital copying machine in a fourth embodiment is the same as the first embodiment, only different parts will be described. In this embodiment, the operation panel shown in FIG. 33 is adopted in instead of operation panel 90 shown in FIG. 2.

Figure 33:
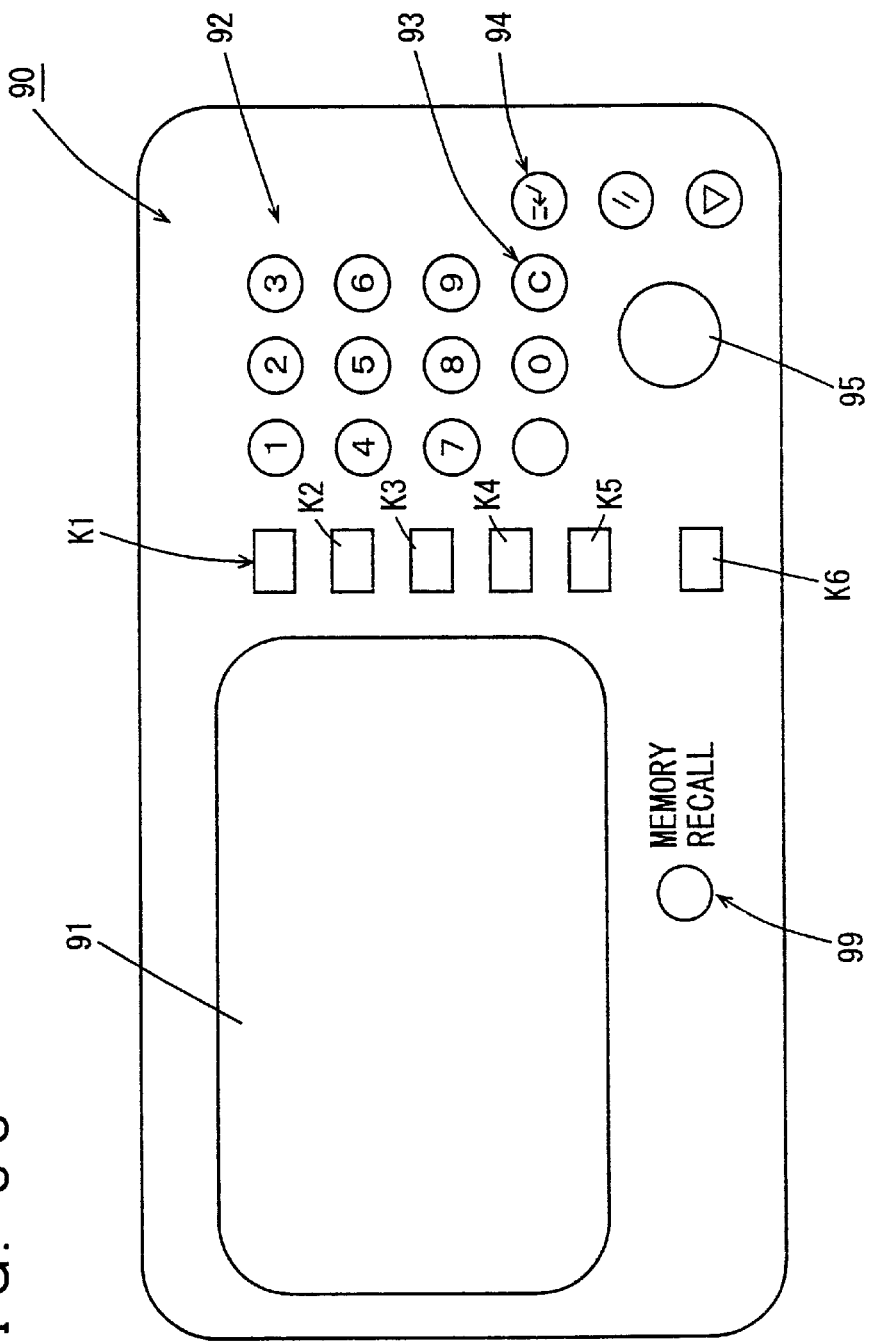
FIG. 33 is a plan view of an operation panel in a fourth embodiment.

Referring to FIG. 33, the operation panel of the digital copying machine in this embodiment is not provided with memory recall mode on/off key 97 and memory recall mode on displaying LED 98. Instead, the operation panel includes a key K1 for setting a magazine binding mode, a key K2 for setting a single feed mode, a key K3 for setting a separate read mode, a key K4 for setting a book original mode, a key K5 for setting an original staple mode, and an ID input key K6 for inputting a user's ID. A user can input a four-digit ID number by pressing down ID input key K6. The ID is displayed correspondingly to registered image data when memory recall key 99 is pressed down. Although inputting an ID is not essential to start copying, a read image is erased from the memory after its output is completed if the ID has not been input. In other words, in this embodiment, the memory recall mode is automatically turned on when an ID has been input and automatically turned off when an ID has not been input.

This is because when a list of image data registered in the device is displayed, the owner of image data without an input ID is not identified, and whether or not the image data can be erased is not determined.

Figure 34:
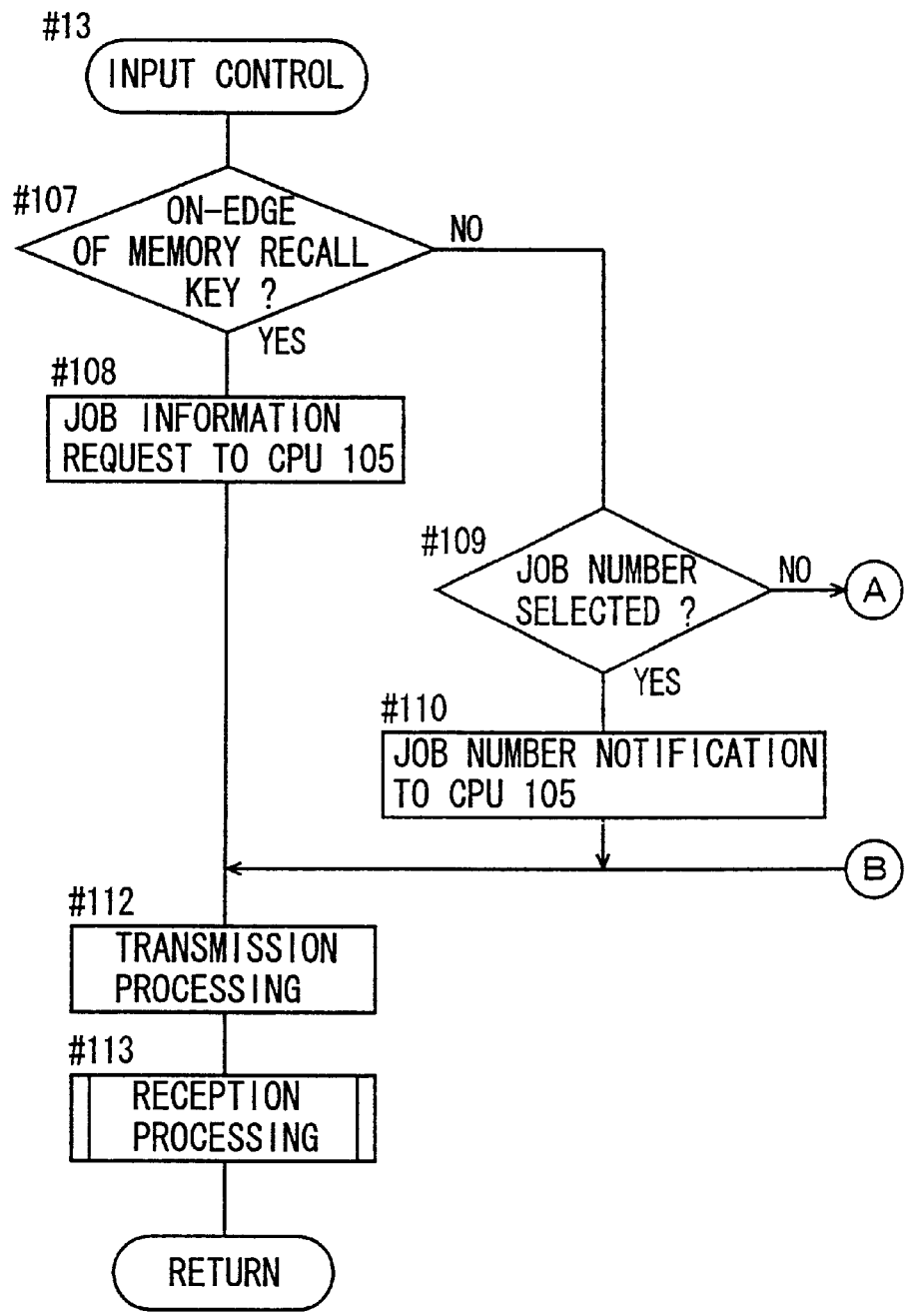
FIGS. 34 and 35 are flow charts showing an input control routine in the fourth embodiment.
Figure 35:
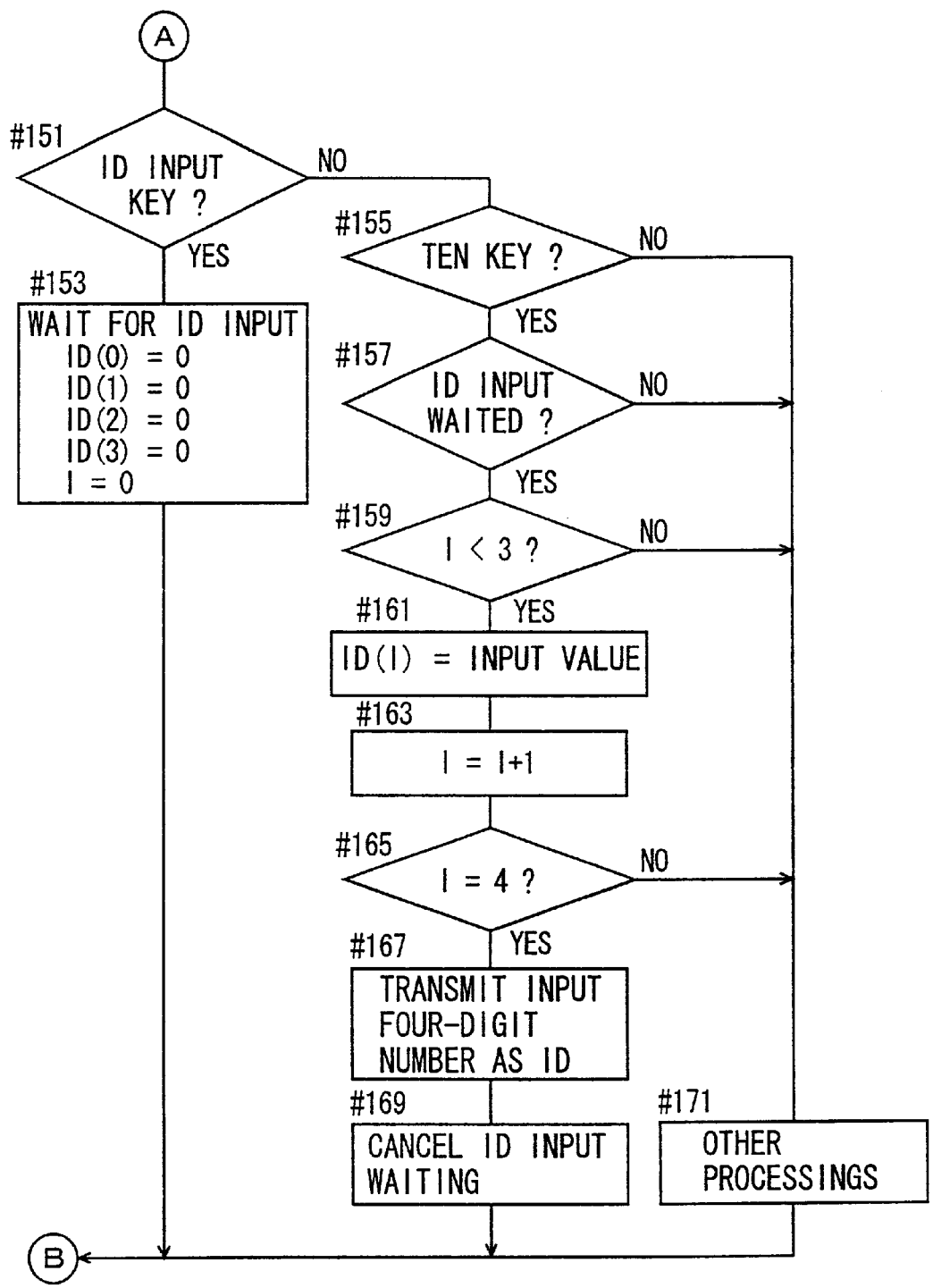

In this embodiment, the flow charts shown in FIGS. 34 and 35 are performed instead of the input control processing shown in FIG. 20. Since steps #107 to #113 in FIG. 34 are the same as the ones in FIG. 20, the description will not be repeated.

In this embodiment, if the result is NO in step #109, the processing advances to step #151 where a determination is made as to whether ID input key K6 has been pressed down. If the result is YES, the processing advances to step #153 where the processing waits for input of an ID number, and variables ID (0) to ID (3) storing a four-digit ID number are all set at "0." Further, a variable I indicating the number of digits of an ID to be input is set at "0." Thereafter, the processing advances to step #112.

If the result is NO in step #151, a determination is made in step #155 as to whether a ten key has been pressed down. If the result is YES, whether or not the current state is the one of waiting for input of an ID is determined in step #157. If the result is YES, the processing advances to step #159.

In step #159, whether or not variable I<3 is determined. If the result is YES, a number which is input through the ten key is substituted in the value of variable ID ()in step #161. Then, I is incremented by one in step #163. In step #165, whether or not I=4 is determined. If the result is YES, the input four-digit number is transmitted as an ID to other CPUs in step #167. Then, the state of waiting for input of an ID is cancelled in step #169 and the processing advances to step #112.

If the result is NO in step #155, other processings are performed in step #171 and the processing advances to step #112.

If the results of steps #157, #159, #165 are NO, the processing advances to step #171.

Figure 37:
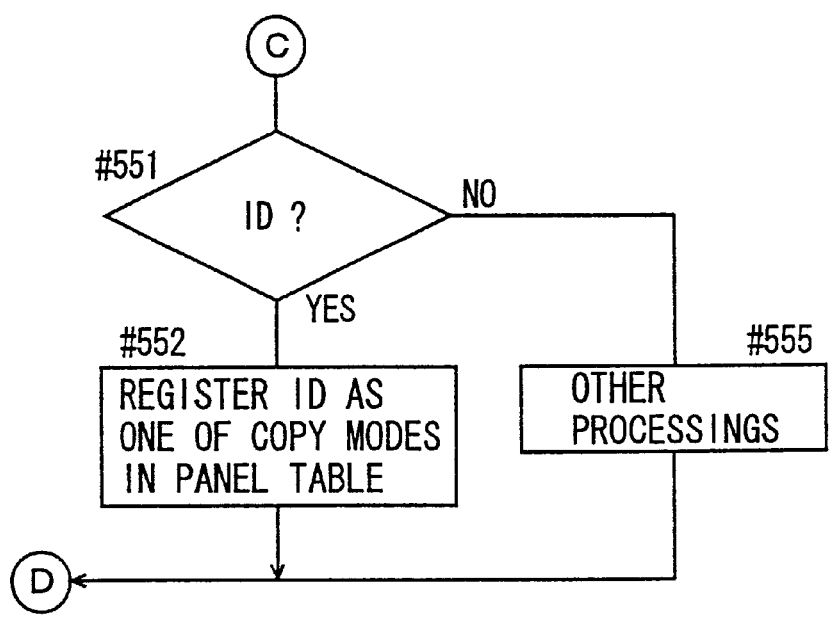
FIGS. 36 and 37 are flow charts showing an input data analysis processing in the fourth embodiment.
Figure 36:
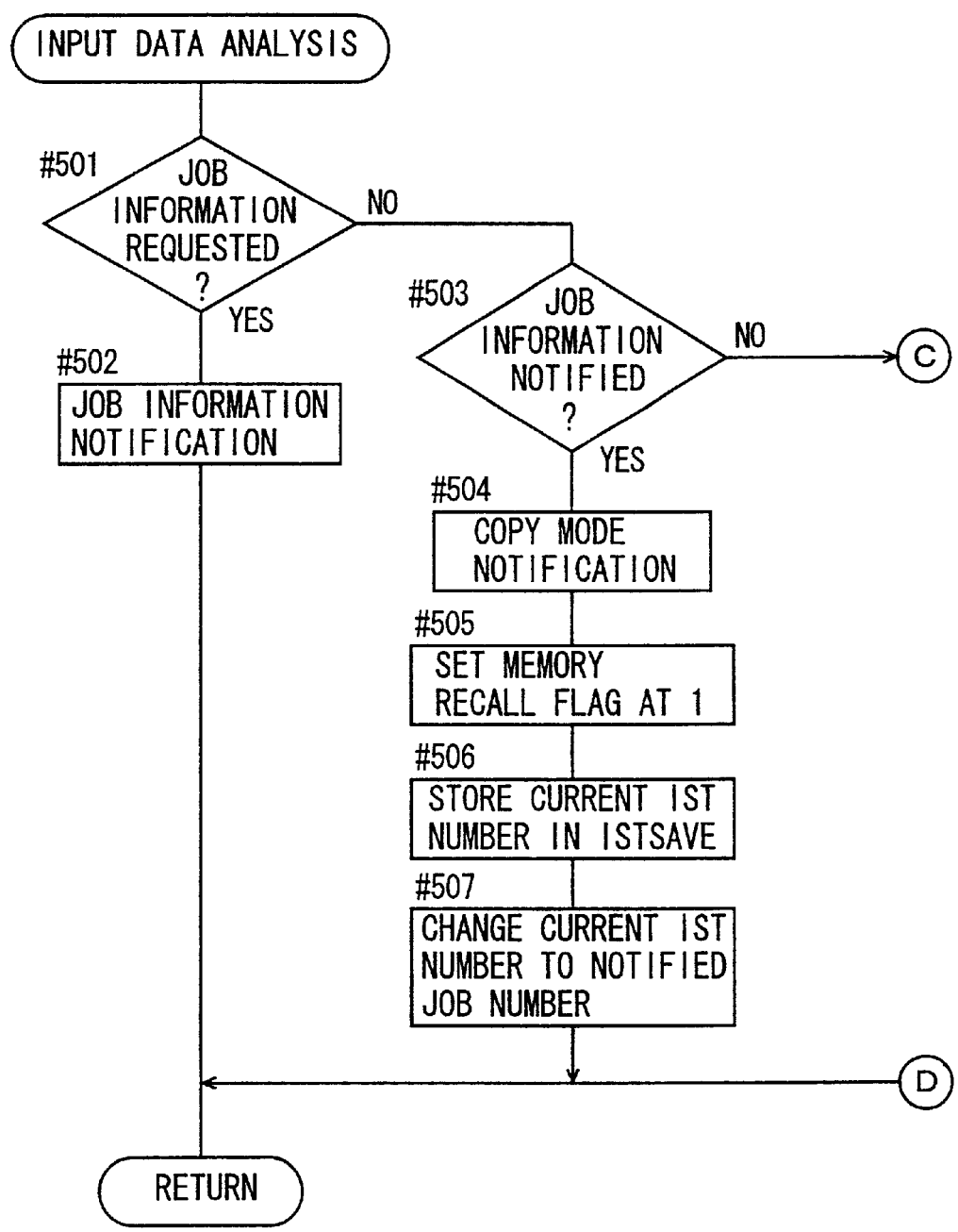

In this embodiment, the flow charts shown in FIGS. 36 and 37 are performed instead of the input data analysis processing shown in FIG. 23. Referring to the figures, if the result is NO in step #503, a determination is made in step #551 as to whether an ID has been transmitted. If the result is YES, the ID is registered as one of copy modes in panel table PT in step #552. Thereafter, the processing returns to the main routine.

If the result is NO in step #551, however, other processings are performed in step #555 and the processing returns to the main routine.

Figure 38:
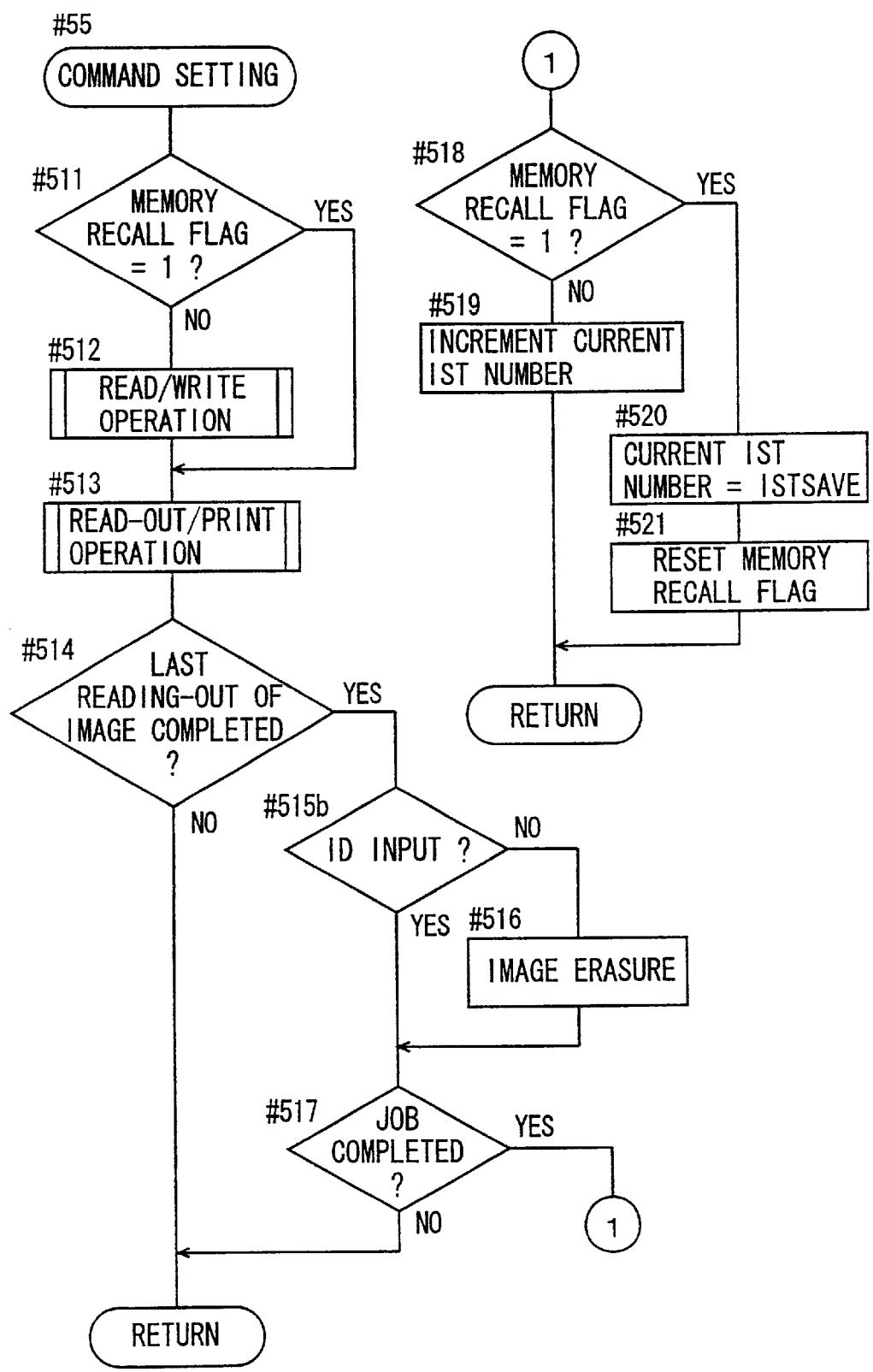
FIG. 38 is a flow chart showing a command setting processing in the fourth embodiment.

For the digital copying machine in this embodiment, the flow chart shown in FIG. 38 is performed instead of the command setting processing shown in FIG. 24. The flow chart is different from the one in FIG. 24 in that whether or not an ID has been input is determined in step #515b, and if the result is YES the processing advances to step #517, otherwise the image is erased in step #516. Thus, memory recall is prevented when an ID has not been input. Therefore, an image of which owner is not identified can be prevented from being recorded into a memory.

Figure 39:
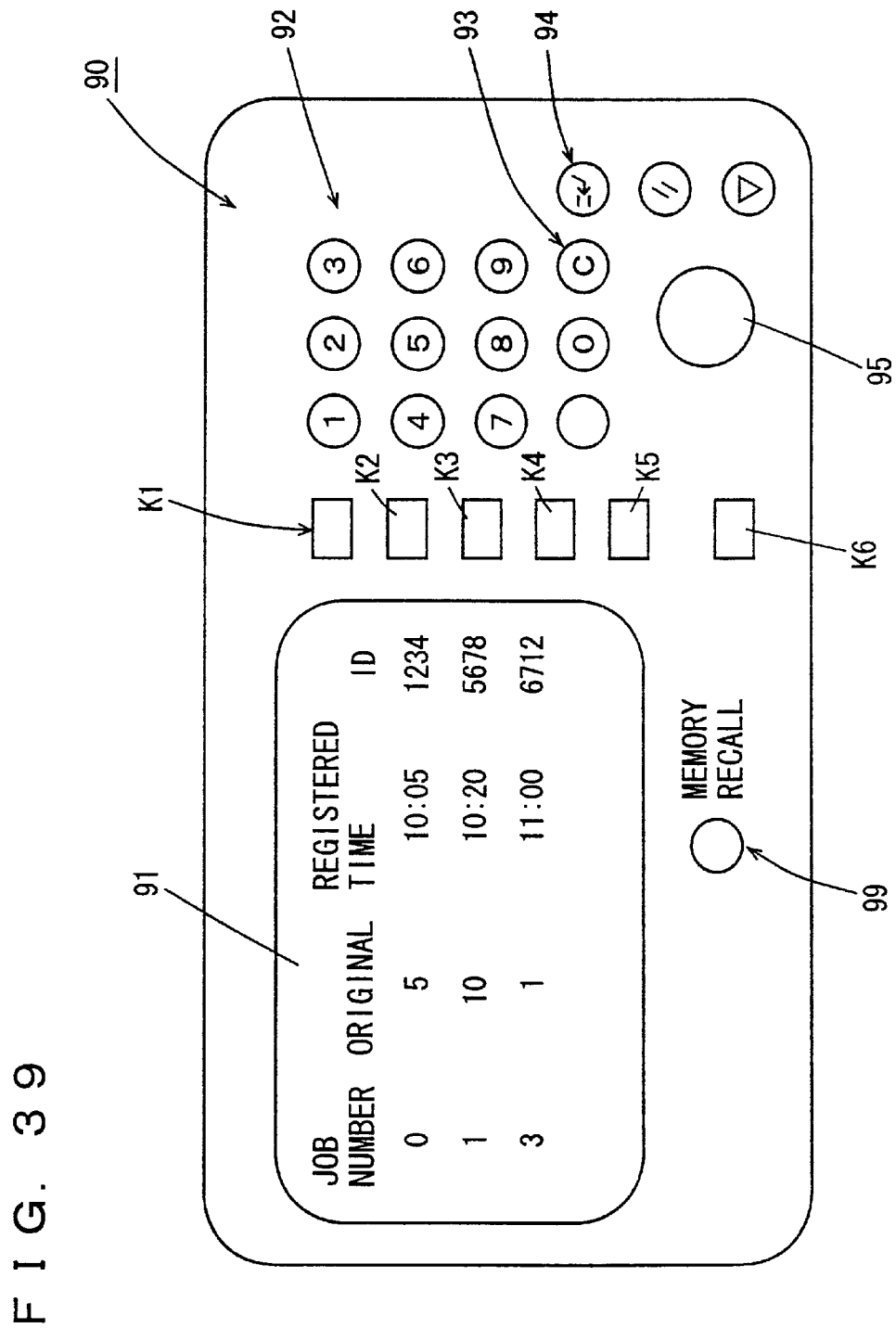
FIG. 39 shows the state after a memory recall key 99 is pressed down in the fourth embodiment.

FIG. 39 shows the state after memory recall key 99 is pressed down in the digital copying machine in this embodiment. Unlike the figure of the operation panel shown in FIG. 21, the ID of a person who registers a job is displayed for each job.

Fifth Embodiment

Figure 40:
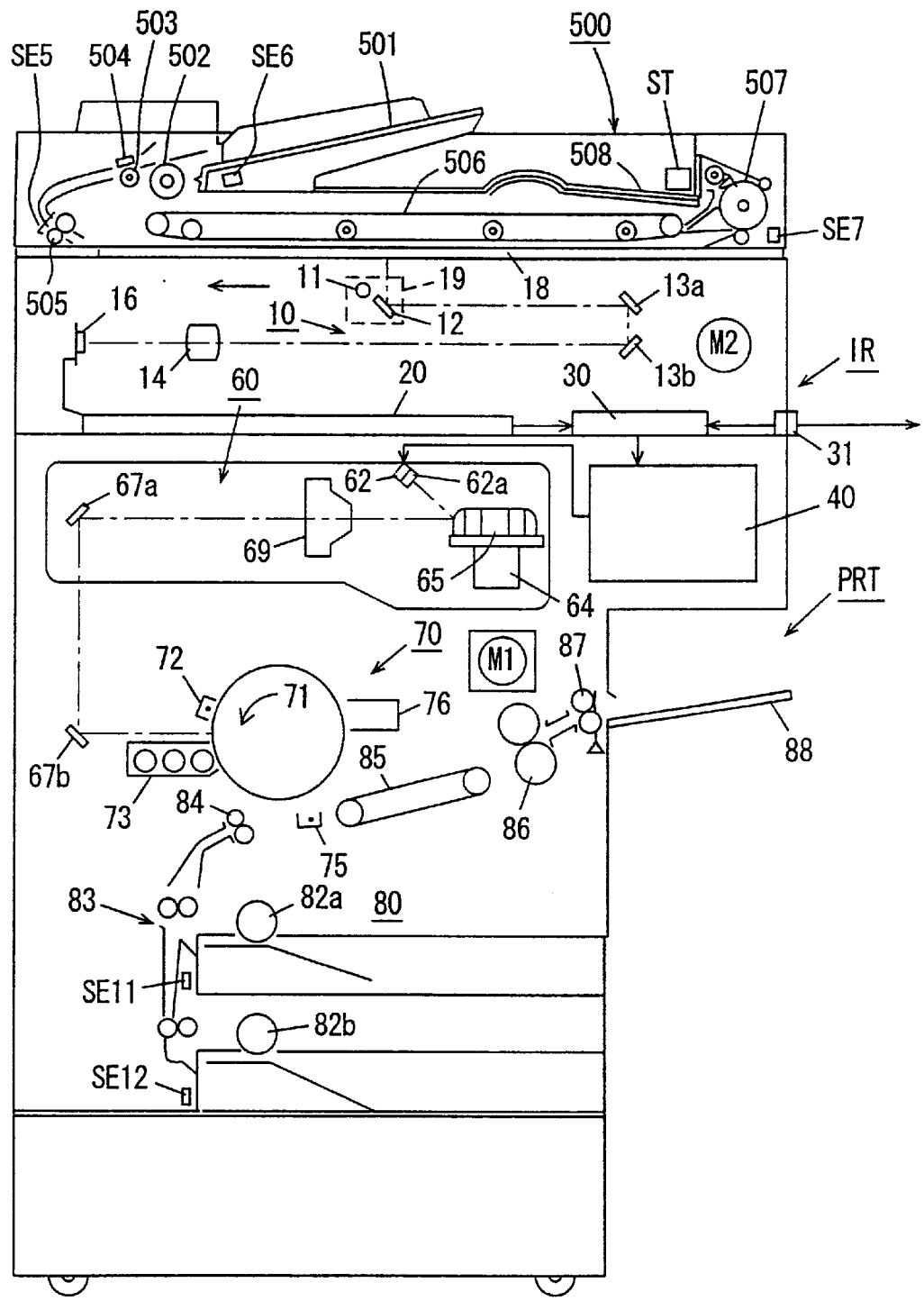
FIG. 40 shows a structure of a digital copying machine in a fifth embodiment.

Since the hardware structure of a digital copying machine in a fifth embodiment is almost the same as the first embodiment, only different parts will be described. In this embodiment, the operation panel shown in FIG. 33 is adapted. Further, ADF 500 is provided with a stapler which staples originals after they are copied as shown in FIG. 40.

The digital copying machine in this embodiment does not include a memory recall mode on/off key. Setting of on/off of the memory recall mode is automatically made by the digital copying machine. Specifically, when the magazine binding mode, the single feed mode, the interrupt read mode, the book original mode, or the original staple mode is set, the memory recall mode is on. This is because when originals are to be read again, it is troublesome to read the originals again in the modes.

When originals are read using ADF 500 and the reading time is longer than prescribed time, the memory recall mode is turned on to store the image data in the memory. Thus, the labor for reading originals again can be reduced.

Figure 41:
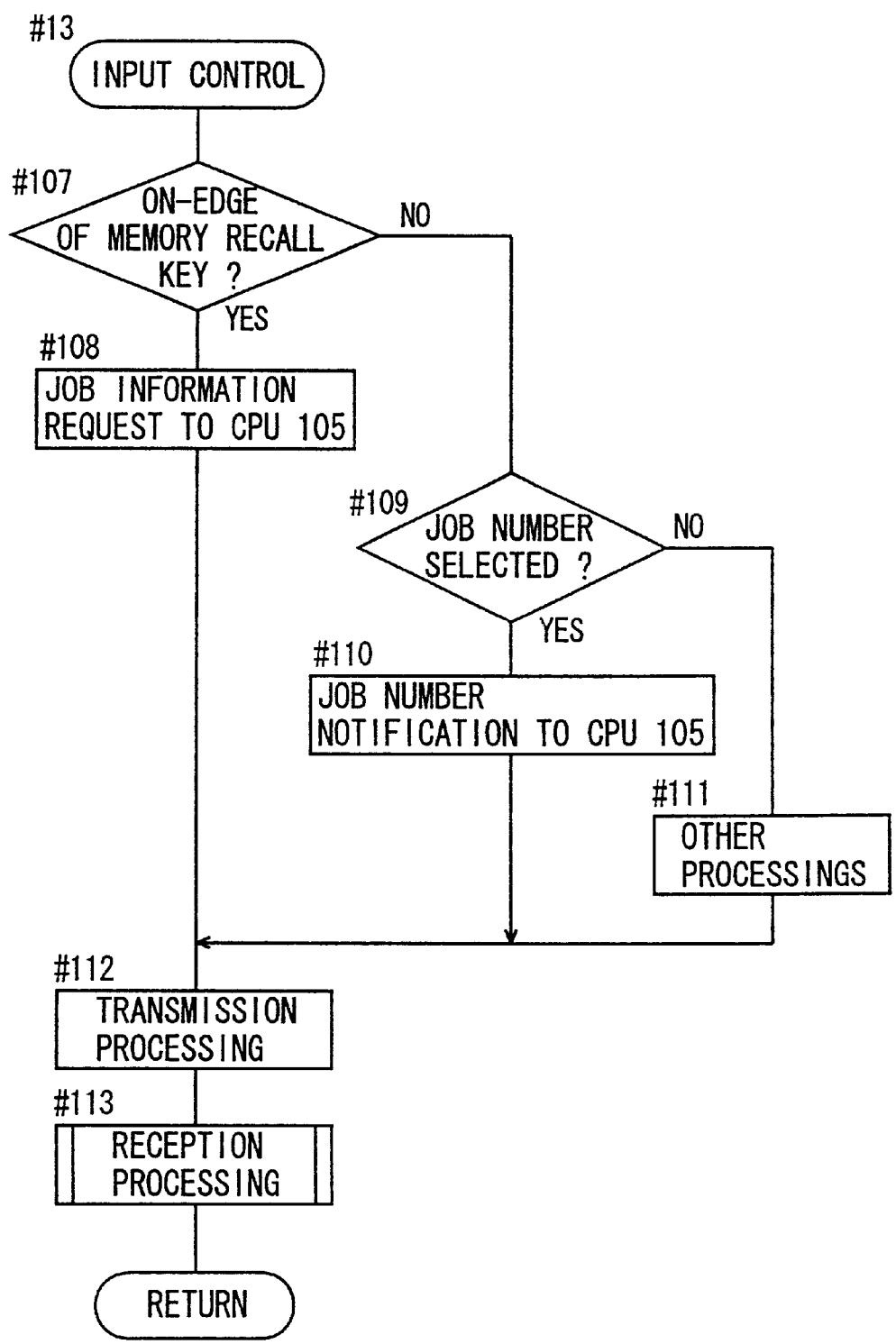
FIG. 41 is a flow chart showing an input control routine in the fifth embodiment.

In this embodiment, the flow chart shown in FIG. 41 is performed instead of the input control processing shown in FIG. 20. Since the memory recall mode on/off key is not provided in the digital copying machine in this embodiment, the processing is omitted.

Figure 42:
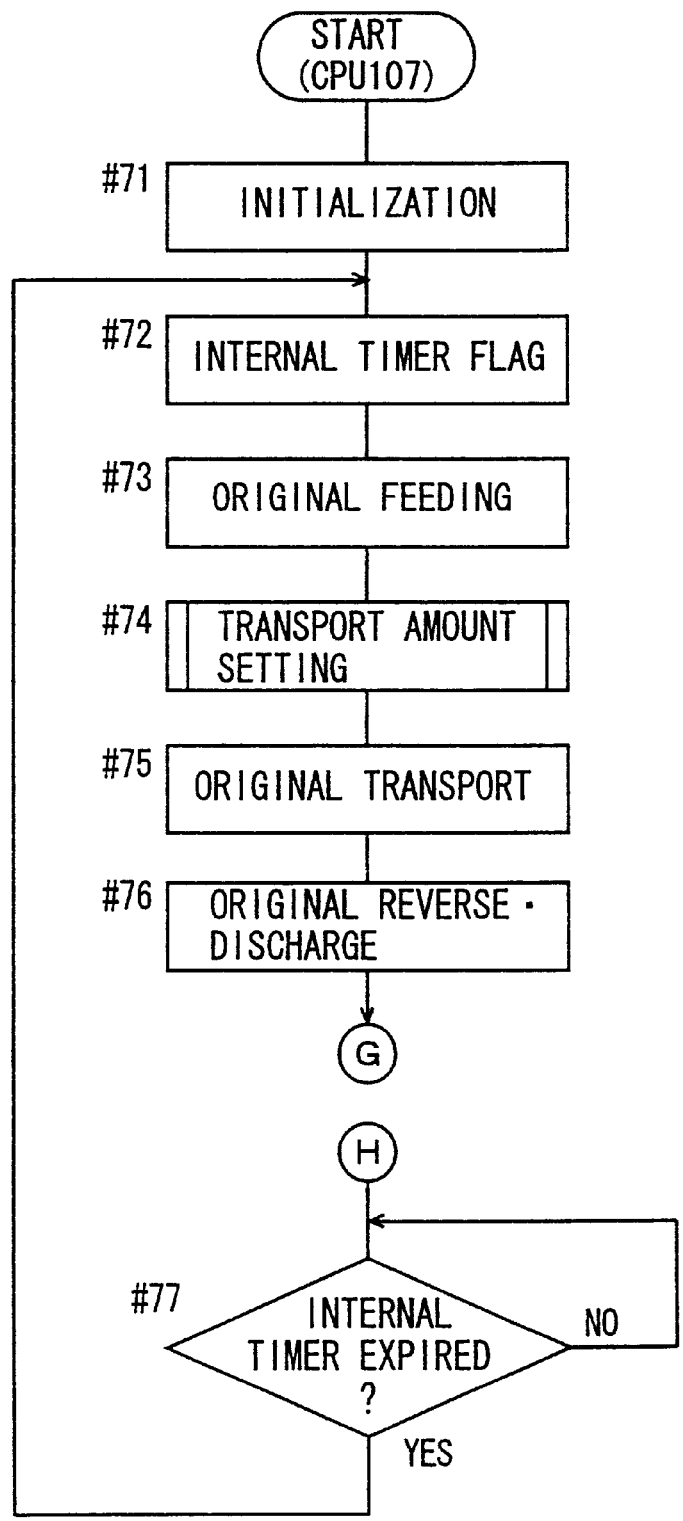
FIGS. 42 and 43 are flow charts showing a processing executed by CPU 107 in the fifth embodiment.
Figure 43:
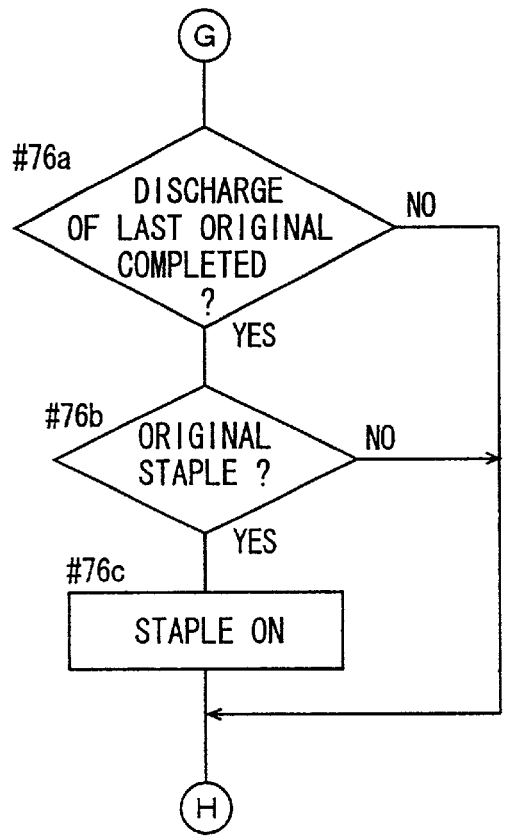

Further, the flow charts shown in FIGS. 42 and 43 are performed instead of the processing of CPU 107 shown in FIG. 19. Referring to the figures, after the processing of step #76, whether or not the last original has been discharged from ADF 500 is determined in step #76a. If the result is YES, whether or not the original staple mode has been set by key K5 is determined in step #76b. If the result is YES, stapler ST of ADF 500 is started in step #76c to staple discharged originals.

If the result of step #76a or step #76b is NO, the processing advances to step #77.

Figure 44:
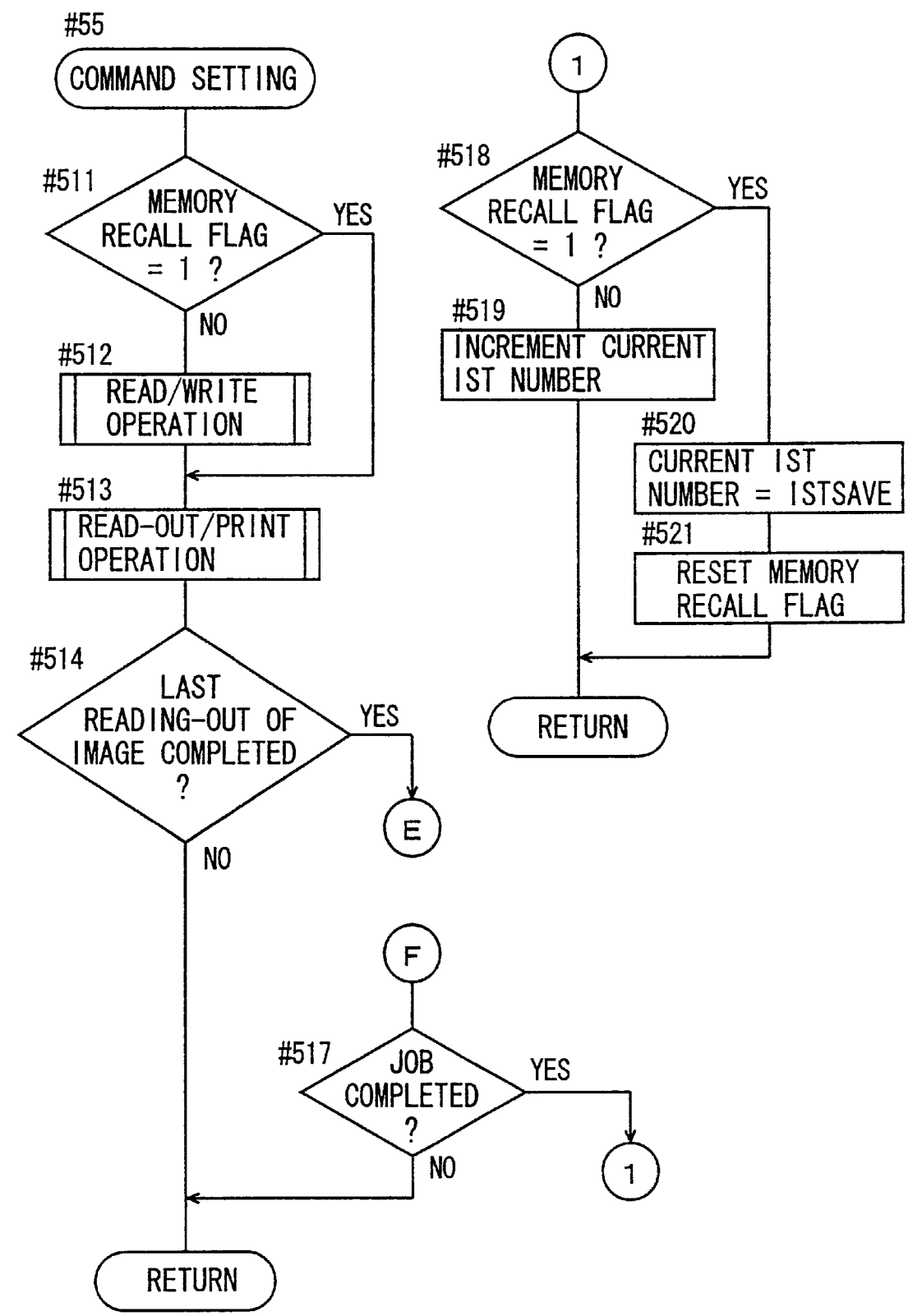
Figure 45:
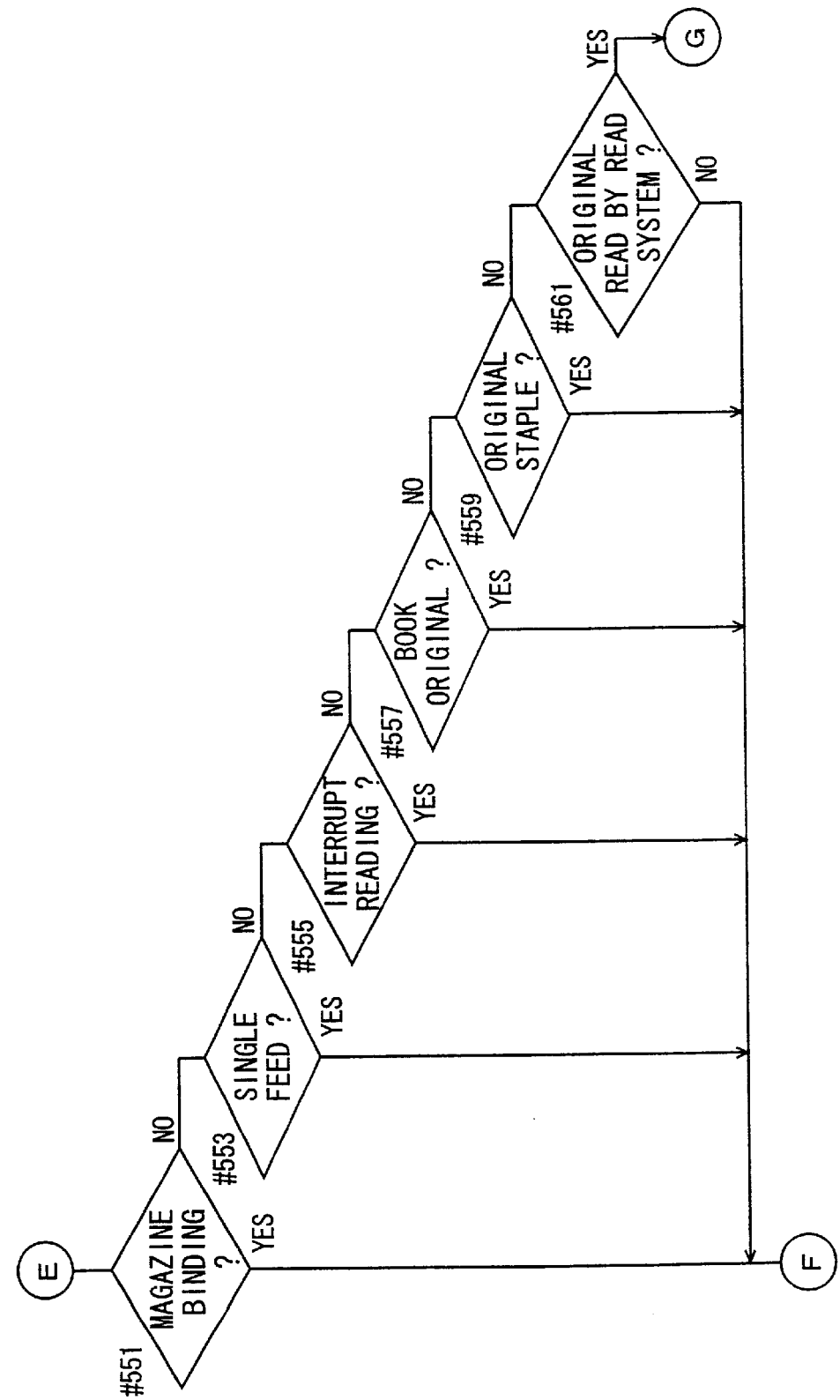

Further, the flow charts shown in FIGS. 44 and 45 are performed instead of the command setting processing shown in FIG. 24. Referring to the figures, if the result is YES in step #514, the processing advances to step #551 where a determination is made as to whether the magazine binding mode has been set. If the result is NO, whether or not the single feed mode has been set is determined in step #553. If the result is NO, whether or not the interrupt read mode has been set is determined in step #555. If the result is NO, whether or not the book original mode has been set is determined in step #557. If the result is NO, whether or not the original staple mode has been set is determined in step #559. If the result is NO, whether or not an original has been read by the read system is determined in step #561.

Figure 46:
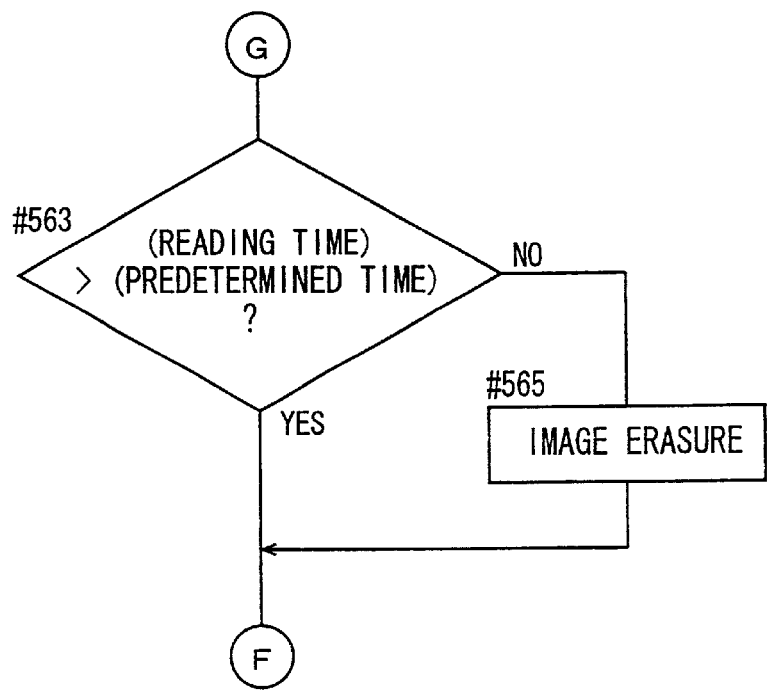
FIGS. 44 to 46 are flow charts showing a command setting processing in the fifth embodiment.

If the result is YES in step #561, the processing advances to step #563 (FIG. 46) where a determination is made as to whether the original reading time exceeds prescribed time.

If the result is NO in step #563, the image is erased in step #565 and the processing advances to step #517.

If one of the results of steps #551, #553, #555, #557, #559, #563 is YES or the result of #561 is NO, however, the processing advances directly to step #517.

Each mode used for the determination in FIG. 45 will be described in the following.

Figure 47:
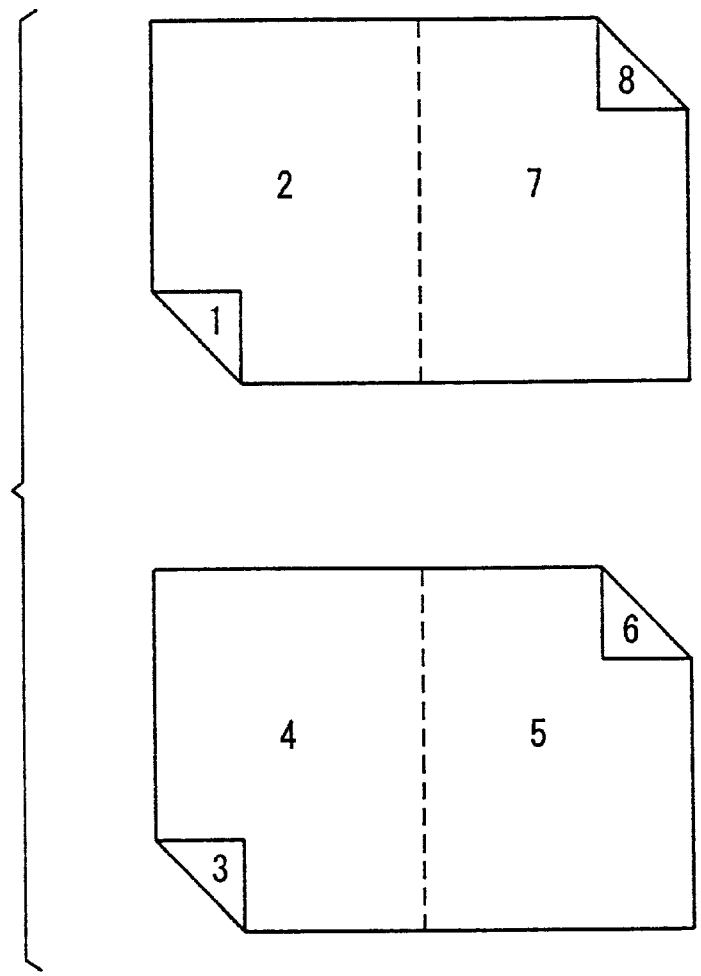
FIG. 47 is a view for describing a magazine binding mode.

The magazine binding mode is a mode of copying the both sides of read originals in a different output order, for example, in the order as shown in FIG. 47. In this mode, the output order has to be changed after all originals are read. Since it takes longer time to finish copying even for a smaller number of originals, memory recall is to be made possible afterward without erasing the images.

The single feed mode is a mode of copying originals which are easily damaged during ADF transport, such as thin originals, while transporting the originals using a special paper feed path. In this mode, originals are set on a special tray 509 in FIG. 40, setting of the originals on the special tray is sensed by sensor SE8, and the transport of the originals are automatically started for copying.

The interrupt read mode is a mode of reading a large number of originals in several portions. This is useful for reading originals for which the ADF cannot be used, and for a combination with the single feed mode or the book original mode. Since it takes longer time to read and a user has always be near the digital copying machine in the interrupt read mode, memory recall is to be made possible.

The original staple mode is a mode of stapling originals which are set in ADF 500 after they are read. Since the finished originals have been stapled, the staple has to be removed when the originals are to be read again. Therefore, memory recall is to be made possible to reduce the burden of a user in the original staple mode.

The book original mode is a mode of copying a thick book such as a hard cover. It is difficult to set such a book on the platen glass and it damages the book. Therefore, memory recall is to be made possible to reduce the burden of a user and to prevent damage to the book.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus printing image data, comprising:
    a platen holding an original;
    an original cover, capable of opening and closing, covering said platen;
    a read unit reading image data from said original;
    a print unit printing said image data;
    a sensor sensing opening and closing of said original cover; and
    a controller storing said read image data, and determining whether to read and print image data from the original on said platen or to read out and print said stored image data without reading image data from said original, based on a sensing result of said sensor after printing by said print unit till issuance of a new print request.

2. The image forming apparatus according to claim 1, wherein said original cover includes an automatic document feeder.

3. An image forming apparatus printing image data, comprising:
    an automatic document feeder setting a plurality of originals;
    a read unit reading image data from said original;
    a print unit printing said image data;
    a first sensor sensing setting of a new original in said automatic document feeder; and
    a controller storing said read image data, and determining whether to read and print image data from the original set in said automatic document feeder or to read out and print said stored image data without reading image data from said original, based on the sensing result of said first sensor after printing by said print unit till issuance of a new print request.

4. The image forming apparatus according to claim 3, further comprising:
    a second sensor sensing opening and closing of said automatic document feeder, wherein
    said controller stores said read image data, and determines whether to read and print image data from the original set in said automatic document feeder or to read out and print said stored image data without reading image data from said original, based on a sensing result of said first and second sensor after printing by said print unit till issuance of a new print request.

5. The image forming apparatus according to claim 4, further comprising:
    a platen holding an original, wherein
    said controller stores said read image data, and determines whether to read and print image data from the original set in said automatic document feeder or the original on said platen or to read out and print said stored image data without reading image data from said original, based on the sensing result of said first and second sensors after printing by said print unit till issuance of a new print request.

6. A method of controlling an image forming apparatus printing read image data, comprising the steps of:
    storing said read image data;
    sensing opening and closing of an original cover covering a platen for holding an original; and
    determining whether to read and print image data from the original on said platen or to read out and print said stored image data without reading image data from said original, based on a sensing result of opening and closing of said cover after printing of said image data till issuance of a new print request.

7. A method of controlling an image forming apparatus printing read image data, comprising the steps of:
    storing said read image data;
    sensing setting of a new original in an automatic document feeder capable of setting a plurality of originals;
    sensing opening and closing of said automatic document feeder; and
    determining whether to read and print image data from the original on said platen or to read out and print said stored image data without reading image data from said original, based on a sensing result of both the step of sensing setting of a new original in the automatic document feeder and the step of sensing opening and closing of the document feeder after printing of said image data till issuance of a new print request.

* * * * *

UNITED STATES PATENT AND TRADEMARK OFFICE
CERTIFICATE OF CORRECTION

PATENT NO.       : 6,987,582 B1  Page 1 of 1
APPLICATION NO.  : 09/422149
DATED            : January 17, 2006
INVENTOR(S)      : Atsumi It is certified that error appears in the above-identified patent and that said Letters Patent is hereby corrected as shown below:

Title Page, Item "(54)" and top of Column 1:
change the first word of the title from "IMAGING" to -- IMAGE --

Signed and Sealed this

Eighth Day of August, 2006

JON W. DUDAS
*Director of the United States Patent and Trademark Office*